(12) United States Patent
Xue et al.

(10) Patent No.: US 12,256,398 B2
(45) Date of Patent: Mar. 18, 2025

(54) TECHNIQUES FOR COLLECTING SIDELINK CHANNEL FEEDBACK FROM A RECEIVING UE

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Xiaojie Wang, Hillsborough, NJ (US); Piyush Gupta, Bridgewater, NJ (US); Peter Gaal, San Diego, CA (US); Shuanshuan Wu, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/315,993

(22) Filed: May 10, 2021

(65) Prior Publication Data

US 2022/0361152 A1    Nov. 10, 2022

(51) Int. Cl.
| | |
|---|---|
| *H04W 72/04* | (2023.01) |
| *H04L 1/18* | (2023.01) |
| *H04L 1/1812* | (2023.01) |
| *H04W 72/23* | (2023.01) |
| *H04W 92/18* | (2009.01) |

(52) U.S. Cl.
CPC .......... *H04W 72/23* (2023.01); *H04L 1/1812* (2013.01); *H04W 92/18* (2013.01)

(58) Field of Classification Search
CPC .. H04W 72/042; H04W 92/18; H04L 1/1812; H04L 1/1822; H04L 2001/0092; H04L 1/1861; H04L 1/1896
See application file for complete search history.

(56) References Cited

U.S. PATENT DOCUMENTS

| 11,470,676 | B2* | 10/2022 | Chen | ................... H04W 4/06 |
| 11,515,967 | B2* | 11/2022 | Hwang | ............... H04L 1/1678 |
| 2019/0357305 | A1* | 11/2019 | Su | ....................... H04W 88/04 |
| 2020/0099479 | A1* | 3/2020 | Park | ..................... H04W 4/70 |

(Continued)

OTHER PUBLICATIONS

Catt: "HARQ Procedure for Mode 1", R2-1900218, 3GPP TSG-RAN WG2 Meeting #105, 3rd Generation Partnership Project, Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 15, 2019, XP051601617, 5 Pages.

(Continued)

*Primary Examiner* — Hoang-Chuong Q Vu
(74) *Attorney, Agent, or Firm* — Holland & Hart LLP

(57) ABSTRACT

Methods, systems, and devices for wireless communications are described. The method may involve a first user equipment (UE) receiving an indication of a set of sidelink resources and an indication of a set of uplink resources for transmitting sidelink feedback information. The first UE may receive a sidelink shared channel transmission from a second UE and upon receiving the sidelink shared transmission, generate feedback information regarding the sidelink shared channel transmission and transmit the feedback information directly to the base station using the set of uplink resources.

26 Claims, 14 Drawing Sheets

(56) References Cited

U.S. PATENT DOCUMENTS

| | | | |
|---|---|---|---|
| 2020/0313805 A1* | 10/2020 | Park | H04L 1/1864 |
| 2020/0403731 A1* | 12/2020 | Zhang | H04W 76/14 |
| 2021/0112574 A1* | 4/2021 | Hosseini | H04L 1/1864 |
| 2021/0219268 A1* | 7/2021 | Li | H04W 72/20 |
| 2021/0266133 A1* | 8/2021 | Zhang | H04L 1/1861 |
| 2021/0352597 A1* | 11/2021 | Do | H04W 52/52 |
| 2021/0409166 A1* | 12/2021 | Wang | H04L 1/1864 |
| 2022/0053496 A1* | 2/2022 | Yu | H04W 72/20 |
| 2022/0053521 A1* | 2/2022 | Yoshioka | H04L 1/1896 |
| 2022/0061055 A1* | 2/2022 | Freda | H04W 72/53 |
| 2022/0110069 A1* | 4/2022 | Wang | H04W 52/146 |
| 2022/0140955 A1* | 5/2022 | Liu | H04W 72/0406 370/329 |
| 2022/0140958 A1* | 5/2022 | Zhou | H04L 1/1887 370/329 |
| 2022/0141866 A1* | 5/2022 | Liu | H04L 5/0012 370/329 |
| 2022/0166558 A1* | 5/2022 | Zhang | H04L 1/1816 |
| 2022/0174720 A1* | 6/2022 | Yang | H04L 1/1854 |
| 2022/0182192 A1* | 6/2022 | Lee | H04L 1/1822 |
| 2022/0201528 A1* | 6/2022 | Shin | H04W 24/10 |
| 2022/0201654 A1* | 6/2022 | Lee | H04W 72/20 |
| 2022/0225342 A1* | 7/2022 | Zhao | H04W 72/569 |
| 2022/0255680 A1* | 8/2022 | Moon | H04W 72/1284 |
| 2022/0287044 A1* | 9/2022 | Yoshioka | H04L 1/1812 |
| 2022/0330316 A1* | 10/2022 | Lee | H04W 72/14 |
| 2022/0353035 A1* | 11/2022 | Ko | H04L 5/00 |
| 2022/0353045 A1* | 11/2022 | Zhao | H04W 72/1289 |
| 2022/0368461 A1* | 11/2022 | Zhang | H04W 72/04 |
| 2022/0376761 A1* | 11/2022 | Lee | H04W 92/10 |
| 2022/0386252 A1* | 12/2022 | Lee | G01S 19/256 |
| 2023/0063901 A1* | 3/2023 | Zhao | H04L 1/1887 |
| 2023/0164803 A1* | 5/2023 | Ko | H04L 1/1864 370/329 |
| 2023/0171703 A1* | 6/2023 | Park | H04W 52/383 370/318 |
| 2024/0057207 A1* | 2/2024 | Basu Mallick | H04W 72/25 |

OTHER PUBLICATIONS

International Search Report and Written Opinion - PCT/US2022/028355—ISA/EPO—Aug. 9, 2022 (2101311WO).

Mediatek Inc: "Discussion on Physical Layer Procedure", 3GPP TSG RAN WG1 #96, R1-1901810, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 9 Pages, XP051599504.

* cited by examiner

TECHNIQUES FOR COLLECTING SIDELINK CHANNEL FEEDBACK FROM A RECEIVING UE

FIELD OF TECHNOLOGY

The following relates to wireless communications, including techniques for collecting sidelink channel feedback from a receiving user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communication. Sidelink communication may be described as communication between two or more wireless devices (e.g., two or more UEs). In one example of sidelink communication, a first UE may transmit a signal directly to a second UE.

SUMMARY

The described techniques relate to improved methods, systems, devices, and apparatuses that support techniques for collecting sidelink channel feedback from a receiving user equipment (UE). Generally, the described techniques provide for a receiving UE to transmit feedback information related to one or more data messages received from a transmitting UE directly to a base station.

A method is described. The method may include receiving, at a first UE, an indication of sidelink resources for communicating with a second UE and an indication of uplink resources for providing sidelink feedback information to a base station, monitoring the indicated sidelink resources for a sidelink shared channel transmission, generating the sidelink feedback information for the sidelink shared channel transmission in accordance with the monitoring, and transmitting the sidelink feedback information for the sidelink shared channel transmission to the base station over the indicated uplink resources.

An apparatus is described. The apparatus may include a processor, memory coupled with the processor, and instructions stored in the memory. The instructions may be executable by the processor to cause the apparatus to receive, at a first UE, an indication of sidelink resources for communicating with a second UE and an indication of uplink resources for providing sidelink feedback information to a base station, monitor the indicated sidelink resources for a sidelink shared channel transmission, generate the sidelink feedback information for the sidelink shared channel transmission in accordance with the monitoring, and transmit the sidelink feedback information for the sidelink shared channel transmission to the base station over the indicated uplink resources.

Another apparatus is described. The apparatus may include means for receiving, at a first UE, an indication of sidelink resources for communicating with a second UE and an indication of uplink resources for providing sidelink feedback information to a base station, means for monitoring the indicated sidelink resources for a sidelink shared channel transmission, means for generating the sidelink feedback information for the sidelink shared channel transmission in accordance with the monitoring, and means for transmitting the sidelink feedback information for the sidelink shared channel transmission to the base station over the indicated uplink resources.

A non-transitory computer-readable medium storing code is described. The code may include instructions executable by a processor to receive, at a first UE, an indication of sidelink resources for communicating with a second UE and an indication of uplink resources for providing sidelink feedback information to a base station, monitor the indicated sidelink resources for a sidelink shared channel transmission, generate the sidelink feedback information for the sidelink shared channel transmission in accordance with the monitoring, and transmit the sidelink feedback information for the sidelink shared channel transmission to the base station over the indicated uplink resources.

In some examples of the method, apparatuses, and non-transitory computer-readable medium described herein, receiving the indication of uplink resources may include operations, features, means, or instructions for receiving sidelink control information (SCI) from the second UE, the SCI including the indication of uplink resources.

In some examples of the method, apparatuses, and non-transitory computer-readable medium described herein, the SCI further includes the indication of sidelink resources.

In some examples of the method, apparatuses, and non-transitory computer-readable medium described herein, the SCI further includes one or more of a hybrid automatic repeat request (HARQ) process identifier (ID), a sidelink process ID, a sidelink assignment index (SAI), a group index, a new feedback indicator (NFI), a trigger bit, or any combination thereof.

In some examples of the method, apparatuses, and non-transitory computer-readable medium described herein, generating the sidelink feedback information may include operations, features, means, or instructions for generating a HARQ codebook according to one or more of: the HARQ process ID, the sidelink process ID, the SAI, the group index, the NFI, or the trigger bit.

In some examples of the method, apparatuses, and non-transitory computer-readable medium described herein, receiving the indication of uplink resources may include operations, features, means, or instructions for receiving downlink control information (DCI) directly from the base station, the DCI including the indication of uplink resources.

Some examples of the method, apparatuses, and non-transitory computer-readable medium described herein may further include operations, features, means, or instructions for receiving a message instructing the first UE to determine whether communication between the first UE and the second UE may be blocked, where transmitting the sidelink feedback information for the sidelink shared channel transmission to the base station over the indicated uplink resources may be based on determining whether communication between the first UE and the second UE may be blocked.

Some examples of the method, apparatuses, and non-transitory computer-readable medium described herein may further include operations, features, means, or instructions for receiving, by the first UE, an indication of a an order of attempt sequence for performing multiple transmissions of the sidelink feedback information using either uplink resources or sidelink resources, where transmitting the sidelink feedback information for the sidelink shared channel transmission to the base station over the indicated uplink resources may be based on the order of attempt sequence.

Some examples of the method, apparatuses, and non-transitory computer-readable medium described herein may further include operations, features, means, or instructions for identifying a mapping between one or more HARQ process IDs and one or more sidelink process IDs.

Some examples of the method, apparatuses, and non-transitory computer-readable medium described herein may further include operations, features, means, or instructions for transmitting the sidelink feedback information for the sidelink shared channel transmission to the second UE.

A method is described. The method may include transmitting, to a first UE, an indication of sidelink resources for communication with a second UE and an indication of uplink resources for providing sidelink feedback information to a base station and transmitting, by the second UE, a sidelink shared channel transmission over the indicated sidelink resources to the first UE.

An apparatus is described. The apparatus may include a processor, memory coupled with the processor, and instructions stored in the memory. The instructions may be executable by the processor to cause the apparatus to transmit, to a first UE, an indication of sidelink resources for communication with a second UE and an indication of uplink resources for providing sidelink feedback information to a base station and transmit, by the second UE, a sidelink shared channel transmission over the indicated sidelink resources to the first UE.

Another apparatus is described. The apparatus may include means for transmitting, to a first UE, an indication of sidelink resources for communication with a second UE and an indication of uplink resources for providing sidelink feedback information to a base station and means for transmitting, by the second UE, a sidelink shared channel transmission over the indicated sidelink resources to the first UE.

A non-transitory computer-readable medium storing code is described. The code may include instructions executable by a processor to transmit, to a first UE, an indication of sidelink resources for communication with a second UE and an indication of uplink resources for providing sidelink feedback information to a base station and transmit, by the second UE, a sidelink shared channel transmission over the indicated sidelink resources to the first UE.

In some examples of the method, apparatuses, and non-transitory computer-readable medium described herein, transmitting the indication of uplink resources may include operations, features, means, or instructions for transmitting SCI to the first UE, the SCI including the indication of the uplink resources.

In some examples of the method, apparatuses, and non-transitory computer-readable medium described herein, the SCI further includes the indication of sidelink resources.

In some examples of the method, apparatuses, and non-transitory computer-readable medium described herein, the SCI further includes a HARQ process ID, a sidelink process ID, a SAI, a group index, a NFI, a trigger bit, or any combination thereof.

Some examples of the method, apparatuses, and non-transitory computer-readable medium described herein may further include operations, features, means, or instructions for receiving an indication of one or more UE IDs from the base station, the one or more UE IDs corresponding to at least the first UE, where transmitting the indication of uplink resources may be based on receiving the indication of the one or more UE IDs.

In some examples of the method, apparatuses, and non-transitory computer-readable medium described herein, receiving one or more UE IDs from the base station may include operations, features, means, or instructions for receiving DCI from the base station, the DCI including the indication of the one or more UE IDs.

Some examples of the method, apparatuses, and non-transitory computer-readable medium described herein may further include operations, features, means, or instructions for receiving a message configuring the second UE with a mapping between a set of UE IDs and a set of HARQ process IDs, where transmitting the indication of uplink resources may be based on receiving the message.

Some examples of the method, apparatuses, and non-transitory computer-readable medium described herein may further include operations, features, means, or instructions for identifying a mapping between one or more HARQ IDs and one or more sidelink process IDs.

Some examples of the method, apparatuses, and non-transitory computer-readable medium described herein may further include operations, features, means, or instructions for receiving the sidelink feedback information for the sidelink shared channel transmission from the first UE.

DETAILED DESCRIPTION

Figure 1:
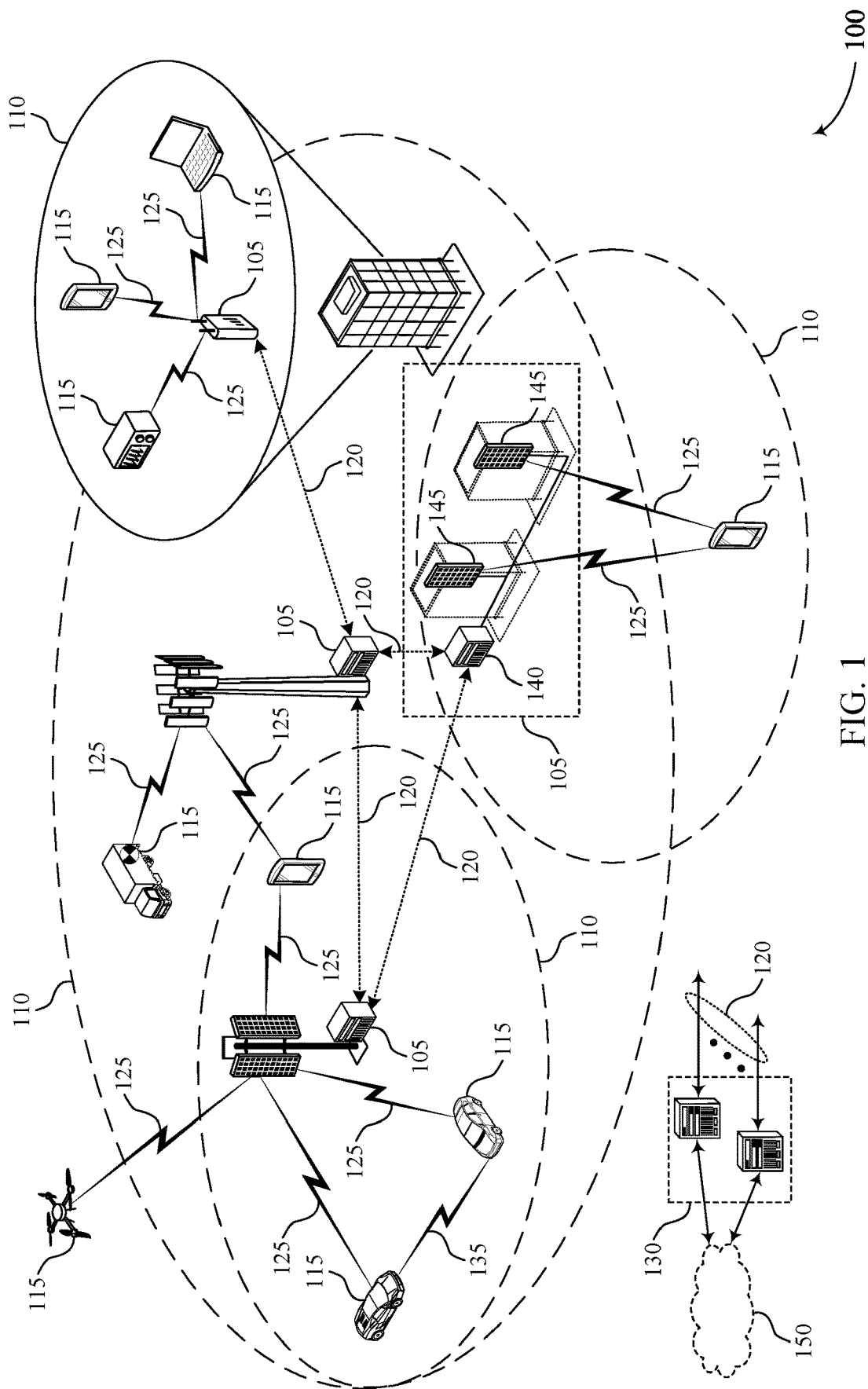
FIGS. 1 and 2 illustrate examples of wireless communications systems that supports techniques for collecting sidelink channel feedback from a receiving user equipment (UE) in accordance with aspects of the present disclosure.

Some wireless communications systems may support sidelink communication. Sidelink communication may be described as communication between two or more wireless devices (e.g., user equipment (UEs)). To support sidelink communication, a base station may transmit control information (e.g., downlink control information (DCI)) to a first user equipment (UE) indicating a set of resources that the first UE may utilize for sidelink communication. In some examples, the first UE may transmit control information (e.g., sidelink control information (SCI)) indicating the set of resources to a second UE and transmit a data message to the second UE using the indicated set of resources. Upon receiving the data message from the first UE, the second UE may transmit feedback information for the data message to the first UE via resources of a physical sidelink feedback channel (PSFCH) and, in some cases, the first UE may forward the feedback information to the base station via uplink control information (UCI), such that the base station may gain knowledge of whether or not the first UE has successfully completed its sidelink process.

However, in some examples, communication between the first UE and the second UE may be blocked. For example, the second UE may be unable to transmit the feedback information to the first UE or the first UE may be unable to forward the feedback information to the base station due to a failed listen-before-talk (LBT) attempt at the first UE or the second UE when operating on an unlicensed band. In either case, the base station may be unable to receive the feedback information and as such may be unable to allocate resources to the first UE for retransmission of the data message to the first UE in the event that the feedback information includes negative acknowledgement (NACK) feedback.

In some examples, a receiving UE may transmit feedback information related to a data message received from a transmitting UE directly to a base station. In one example, a first UE may receive control information (e.g., DCI) from the base station including an indication of uplink resources for transmitting sidelink feedback information and relay the indication of uplink resources to the second UE via SCI. The first UE may transmit a data message to the second UE and the second UE may transmit feedback information related to the data message to the base station using the indicated uplink resources. In another example, the base station may transmit control information (e.g., DCI) including the indication of uplink resources for transmitting sidelink feedback information directly to the second UE. In some examples, the control information (e.g., DCI or SCI) may include information for generating a hybrid automatic repeat request (HARQ) codebook (e.g., a HARQ process identifier (ID), a sidelink assignment index (SAI), a sidelink process ID, a group index, a new feedback indicator (NFI), or a trigger bit for a Type 3 HARQ codebook). In some examples, the base station may indicate one or more UE IDs to the first UE via the control information. The one or more UE IDs may include IDs of UEs for which the first UE may transmit a data message to (e.g., the second UE). The techniques described herein may provide an additional route for the base station to receive sidelink feedback information which may increase reliability and reduce latency.

Aspects of the disclosure are initially described in the context of wireless communications systems. Additional aspects of the disclosure are described in the context of a feedback scheme and a process flow. Aspects of the disclosure are further illustrated by and described with reference to apparatus diagrams, system diagrams, and flowcharts that relate to techniques for collecting sidelink channel feedback from a receiving UE.

FIG. 1 illustrates an example of a wireless communications system 100 that supports techniques for collecting sidelink channel feedback from a receiving UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a receiving UE 115 may receive a data message from a transmitting UE 115 and report feedback information related to the data message directly to the base station 105. In some examples, the receiving UE 115 may receive an indication of uplink resources via SCI from the transmitting UE or DCI from the base station 105, generate the feedback information, and transmit the feedback information to the base station 105 via the indicated uplink resources. The receiving UE may also receive information for generating the feedback information via the SCI or the DCI (e.g., HARQ process ID).

Figure 2:
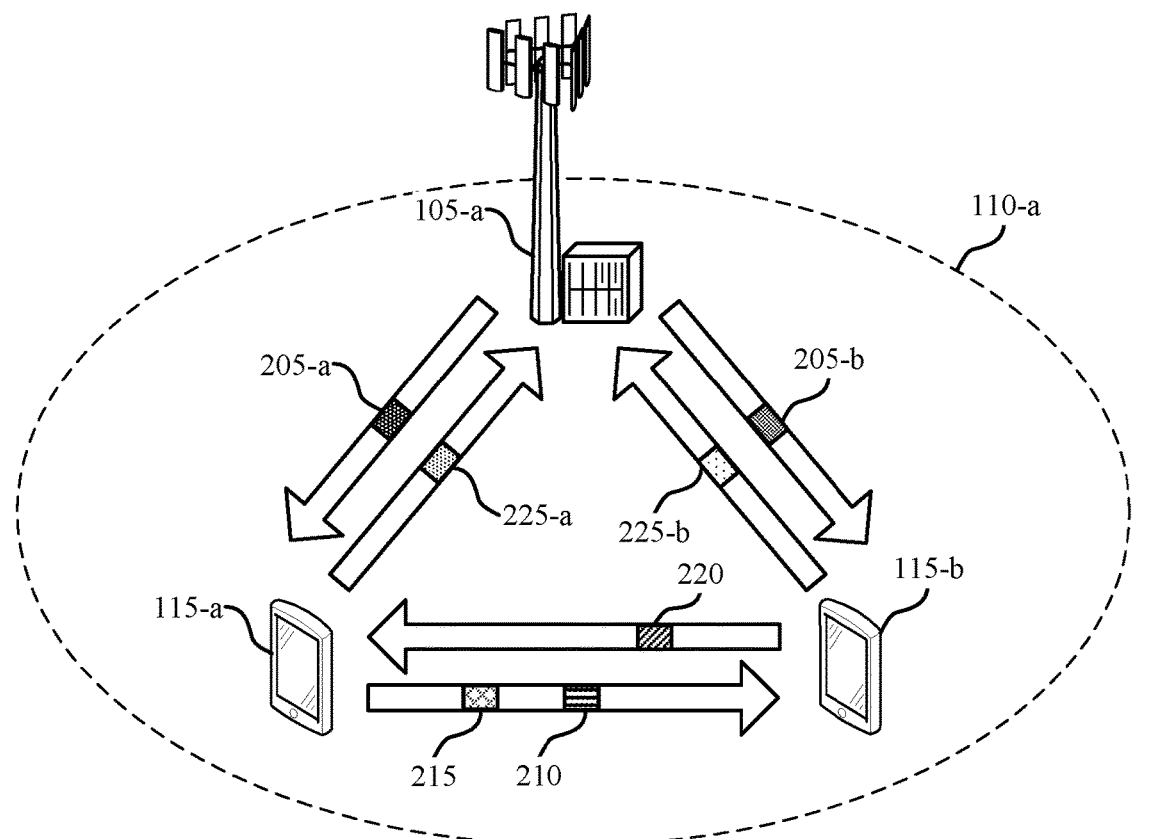

FIG. 2 illustrates an example of a wireless communications system 200 that supports measurement techniques for collecting sidelink channel feedback from a receiving UE in accordance with aspects of the present disclosure. In some examples, the wireless communications system 200 may implement aspects of a wireless communications system 100. For example, the wireless communications system 200 may include a base station 105-a, a UE 115-a, and a UE 115-b which may be examples of a base station 105 and a UE 115 as described with reference to FIG. 1. In some examples, the base station 105-a, the UE 115-a, and the UE 115-b may be located within a coverage area 110-a.

The wireless communications system 200 may support sidelink communication. That is, communication between wireless devices (e.g., the UE 115-a and the UE 115-b). In some examples, the UE 115-a may be an example of a transmitting device and the UE 115-b may be an example of a receiving device. The UE 115-a may determine a set of physical sidelink shared channel (PSSCH) resources for transmitting a data message 215 to the UE 115-b one of two ways. One way is that the UE 115-a may receive a grant (e.g., via DCI 205-a) from the base station 105-a indicating the set of PSSCH resources. Another way is that the UE 115-a may autonomously select the set of PSSCH resources based on a sensing procedure (e.g., decoding SCI 210 of other UEs 115). Once the UE 115-a determines the set of PSSCH resources, the UE 115-a may transmit an indication of the set of PSSCH resources to the UE 115-b such that the UE 115-b may have knowledge of which PSSCH resources to monitor for the data message 215. In some examples, the indication of the set of PSSCH resources may be included in SCI 210.

In some examples, the UE 115-b may provide a feedback message 220 regarding the data message 215 to the UE 115-a and the UE 115-b may forward feedback information to the base station 105-a. In such example, the base station 105-a may provide the UE 115-a (e.g., via DCI 205-a) with a HARQ process ID and an indication of a set of uplink resources for transmitting the feedback information to the base station 105-a. After receiving DCI 205-a from the base station 105-a, the UE 115-a may determine a sidelink process identity (ID) to serve the HARQ process ID and include the sidelink process ID in SCI 210 to the UE 115-b. The SCI 210 may also include one or more of a source ID (e.g., Source L1 ID), a destination ID (e.g., Destination L1 ID), and a SCI process ID. When the UE 115-b receives the data message 215 from the UE 115-a, the UE 115-b may map the data message 215 to the corresponding sidelink process ID based on the source ID, destination ID, or SCI process ID of the data message 215. That is, the UE 115-b may utilize the sidelink process ID to keep track of which data transmissions are associated with which sidelink link. The UE 115-b may then transmit the feedback message 220 associated with the data message 215 over a set of PSFCH resources. For example, the UE 115-b may transmit a one-bit sequence acknowledgement (ACK)/NACK over the set of PSFCH resources. ACK feedback may indicate that the UE 115-a was able to successfully decode the data message 215, whereas NACK feedback may indicate that the UE 115-a was unable to decode the data message 215. The UE 115-a may determine the set of PSFCH resources based on the source ID (e.g., ID associated with the UE 115-a) and a subchannel ID (e.g., subchannel used to transmit the data message 215 to the UE 115-b).

Once the UE 115-a receives the feedback message 220 from the UE 115-b, the UE 115-a may forward the feedback information associated with the feedback message 220 to the base station 105-a via the set of uplink resources indicated in DCI 205-a. For example, the UE 115-a may construct a HARQ codebook (e.g., Type 1 codebook or Type 2 codebook) using the indicated HARQ process ID and transmit the HARQ codebook to the base station 105-b via UCI 225-a. In the case that the UE 115-b transmits NACK feedback related to the data message 215 to the base station 105-a, the base station 105-a may indicate a new set of PSSCH resources to the UE 115-a via DCI 205-a and the UE 115-a may utilize the new set of PSSCH resources to retransmit the data message 215 to the UE 115-b.

In some examples, sidelink communication may occur over an unlicensed band. In such example, the UE 115-a and the UE 115-b may utilize an LBT protocol to access a channel (e.g., PSSCH or PSFCH). Because the UE 115-a and the UE 115-b may only access the channel at a slot boundary (e.g., for PSSCH) or at a very limited set of symbols (e.g., for PSFCH), the UE 115-a and the UE 115-b may be put in an inferior position when competing with other random access technologies (RATs). As such, there may be instances where the UE 115-a or the UE 115-b are unable to access the channel. For example, LBT may fail at UE 115-b when the UE 115-b is attempting to gain access to transmit the feedback message 220 to the UE 115-a or LBT may fail at the UE 115-a when the UE 115-a is attempting to gain access to transmit the feedback information to the base station 105-a. In either case, the base station 105-a may fail to receive feedback information regarding sidelink communications between the UE 115-a and the UE 115-b.

In some examples, the base station 105-a may collect feedback information regarding a sidelink message (e.g., data message 215) directly from a sidelink receiving UE. For example, the UE 115-a and the UE 115-b may be within coverage area 110-a and as such may be connected to the base station 105-a via respective Uu interfaces. The UE 115-a may receive DCI 205-a from the base station 105-a. DCI 205-a may include an indication of a set of PSSCH resources for transmitting the data message 215 to the UE 115-a and an indication of a set of uplink resources to be used by the UE 115-b to transmit the feedback information associated with the data message 215 to the base station 105-a. The UE 115-a may relay the indication of the set of uplink resources to the UE 115-b via SCI 210. Additionally or alternatively, the UE 115-a may also include an indication of a HARQ process ID, a sidelink process ID, an SAI, a group index, a NFI, a trigger bit, etc. in SCI 210. The UE 115-b may receive the data message 215 from the UE 115-a over the set of PSSCH resources, generate feedback information related to the data message 215, and transmit the feedback information to the base station 105-a over the set of uplink resources (e.g., via UCI 225-b) indicated in SCI 210. Alternatively, the UE 115-b may receive an indication of uplink resources for feedback information regarding the data message 215 directly from the base station 105-a via DCI 205-b and transmit the feedback information to the base station 105-a over the set of uplink resource (e.g., via UCI 225-b).

Generating the feedback information may include generating a HARQ codebook. The UE 115-b may construct various HARQ codebooks. For example, the UE 115-b may construct a Type 1 HARQ codebook using the indication of the set of uplink resources and the HARQ process ID. Alternatively or additionally, the UE 115-b may construct a Type 2 HARQ codebook using the indication of the uplink resources, the HARQ process ID, and the SAI. Further, the UE 115-*b* may construct an enhanced Type 2 HARQ codebook using the indication of the uplink resources, the HARQ process ID, the SAI, the group index, and the NFI. Moreover, the UE 115-*b* may construct a Type 3 HARQ codebook using the indication of the uplink resource and a 1-bit request (e.g., trigger bit). Transmitting the feedback information to the base station 105-*a* may include transmitting the generated HARQ codebook.

In some examples, the UE 115-*a* may receive an indication of which UE 115 to transmit the indication of the set of uplink resource to. For example, the UE 115-*a* may receive DCI 205-*a* including a UE ID associated with the UE 115-*b*. In some examples, the UE 115-*a* may be capable of multiple sidelink links (e.g., 32 links). That is, the UE 115-*b* may communicate with up to 32 other UEs 115. In such case, the DCI 205-*a* may include a unique 5-bit sequence indicating the UE 115-*b*. In other cases, the DCI 205-*a* may specify a set of UE IDs. That is, the base station 105-*a* may indicate a set of candidate UEs 115 which may receive the indication of the uplink resources from the UE 115-*a* and the UE 115-*a* may select which UE 115 of the set to transmit the data message 215 to. Alternatively or additionally, the UE 115-*a* may be configured by the network (e.g., base station 105-*a*) with a mapping between a HARQ process ID and a UE ID. For example, the mapping may specify to transmit the indication of the set of uplink resources to the UE 115-*b* for all odd numbered HARQ process IDs and transmit the indication of uplink resources to a different UE 115 for all even numbered HARQ process IDs.

In some examples, the UE 115-*b* may be capable of transmitting the feedback message 220 over multiple PSFCH opportunities or transmitting the feedback information over multiple UCI opportunities. In such example, the UE 115-*b* may be configured with an attempting order. The attempting order may specify the order in which the UE 115-*b* may transmit either the feedback message 220 or the feedback information over the multiple opportunities. For example, if the UE 115-*b* is capable of transmitting the feedback message 220 over three PSFCH opportunities. The attempting order may specify for the UE 115-*b* to transmit the feedback message 220 over the first PSFCH opportunity followed by the feedback message 220 over the second PSFCH opportunity followed by the feedback information over UCI followed by the feedback message 220 over the third PSFCH opportunity. In some examples, the UE 115-*b* may be configured with a set of attempting orders (e.g., via RRC signaling) and may receive signaling indicating which attempting order of the list to use.

As described herein, the UE 115-*b* may transmit feedback information regarding the data message 215 received from the UE 115-*a* directly to the base station 105-*a*. In some examples, the UE 115-*b* may additionally send the feedback message 220 regarding the data message 215 to the UE 115-*b*. That is, the base station 105-*a* may receive UCI 225-*a* carrying the feedback information related to the data message 215 from the UE 115-*a* as well as UCI 225-*b* carrying the same feedback information from the UE 115-*b*. In some examples, the base station 105-*a* may receive UCI 225-*a* and UCI 225-*b* simultaneously and combine the two UCIs 225 for enhanced reliability. Alternatively, the UE 115-*b* may not transmit the feedback message to the UE 115-*b* over PSFCH resources.

In one example, the UE 115-*b* may transmit feedback regarding the data message 215 based on a prioritized order. For example, the UE 115-*b* may receive indication to transmit feedback information regarding the data message 215 if the UE 115-*b* is unable to transmit the feedback message 220. The feedback message 220 may be blocked when the UE 115-*a* is listening to higher priority PSSCH that falls within the same time and frequency resources as the feedback message 220 or the UE 115-*a* may not indicate in SCI 210 a request for the feedback message 220 from the UE 115-*b*. If the UE 115-*b* determines that it is unable to transmit the feedback message 220 to the UE 115-*b*, the UE 115-*a* may transmit the feedback information regarding the data message 215 to the base station 105-*a* using the set of uplink resources. The methods described herein may allow for an alternative route for the base station 105-*a* to collect feedback information related to sidelink messages which may improve reliability. In addition, transmitting feedback information directly to the base station 105-*a* as opposed to utilizing UE 115-*a* as relay may decrease latency.

Figure 3:
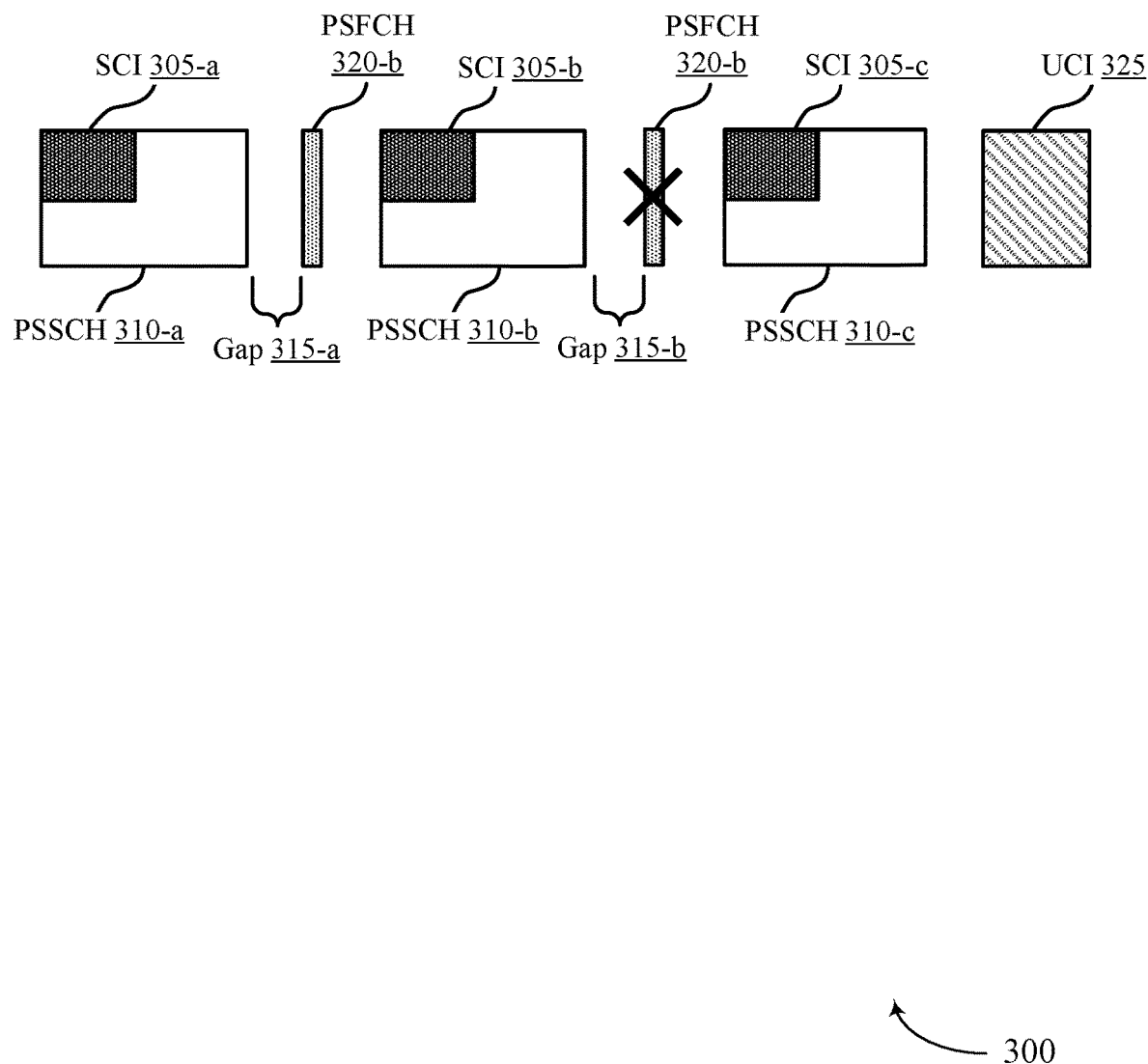
FIG. 3 illustrates an example of a feedback scheme that supports techniques for collecting sidelink channel feedback from a receiving UE in accordance with aspects of the present disclosure.

FIG. 3 illustrates an example of a feedback scheme 300 that supports techniques for collecting sidelink channel feedback from a receiving UE in accordance with aspects of the present disclosure. In some examples, the feedback scheme 300 may implement aspects of a wireless communications system 100 and a wireless communications system 200.

As described with reference to FIG. 2, a receiving UE may generate a HARQ codebook associated with a data message received from a transmitting UE and transmit the HARQ codebook directly to a base station. In some examples, the receiving UE may generate a Type 3 HARQ codebook. In such example, the receiving UE may receive SCI 305 from the transmitting UE including a one-bit request for a HARQ codebook along with an indication of a set of uplink resources to use for transmitting the Type 3 HARQ codebook to the base station.

In some examples, the indication of uplink resources may not be included in every SCI 305 received by the receiving UE. For example, the receiving UE may receive SCI 305-*a* from the transmitting UE. SCI 305-*a* may not include an indication of uplink resources, but may instead include a first HARQ process ID and a first sidelink process ID. The receiving UE may then receive a first data message over a PSSCH 310-*a* and transmit a feedback message associated with the first data message to the transmitting UE via a PSFCH 320-*b* after gap 315-*a* (e.g., system wide gap). After some time, the receiving UE may receive SCI 305-*b* including a second HARQ process ID and a second sidelink process ID. The receiving UE may then receive a second data message from the transmitting UE over PSSCH 310-*b*. In some examples, the receiving UE may be unable to transmit a feedback message associated with the second data message to the transmitting (e.g., due to LBT failure) after gap 315-*b* over PSFCH 320-*b*. After some time, the receiving UE may receive SCI 305-*a* from the transmitting UE and may then receive a third data message from the transmitting UE over PSSCH 310-*c*. Unlike SCI 305-*a* and SCI 305-*b*, SCI 305-*a* may include a third HARQ process ID, a third sidelink process ID, an indication of a set of uplink resources, and a one-bit request for a Type 3 HARQ codebook.

Based on receiving the indication of the set of uplink resources, the receiving UE may identify all of the sidelink process IDs associated with current source ID (e.g., the first sidelink process ID, the second sidelink process ID, and the third sidelink process) and construct a Type 3 codebook according to the HARQ process IDs linked to the identified sidelink process IDs (e.g., the first HARQ process ID, the second HARQ process ID, and the third HARQ process ID). The receiving UE may then transmit the Type 3 HARQ codebook over the indicated set of uplink resources (e.g., UCI 325) to the base station. As such, the base station may receive feedback information related to multiple PSSCH transmissions without the receiving UE receiving the indication of uplink resources in every SCI 305.

In some examples, the transmitting UE may identify a mapping between the HARQ process ID and the sidelink process ID. The mapping may specify that the HARQ process ID is the same as the sidelink process ID. In one example, the mapping may be fixed. That is, the base station may configure the transmitting UE and the receiving UE with the mapping using radio resource control (RRC) signaling. Alternatively, the transmitting UE may include a 1-bit flag in the SCI 305 indicating to the receiving UE that the sidelink process ID is the same as the HARQ process ID.

As discussed with reference to FIG. 2, the receiving UE may receive a standalone DCI from the base station containing information related to transmitting sidelink feedback to the base station (e.g., indication of uplink resources or a trigger bit for a Type 3 HARQ codebook) as opposed to receiving the information in SCI 305 from the transmitting UE. In some examples, the standalone DCI may request a status of sidelink reception processes that have been associated with a sidelink link (e.g., link between the transmitting UE and the receiving UE). In some examples, the standalone DCI may specify a source ID. The source ID may be different from the source ID carried in SCI 305. For example, the source ID may be a sidelink L2 source ID managed by the base station. The format of the DCI may be a variation of DCI format 1-1 with an invalid fault detection and recovery algorithm (FDRA) or a variation of DCI format 3-0 with an invalid leading subchannel index.

Based on the standalone DCI received from the base station, the receiving UE may construct a Type 3 HARQ codebook for data messages corresponding to sidelink processes associated with the indicated source ID and transmit the Type 3 HARQ codebook to the base station. In other examples, the base station may collect a Type 3 HARQ codebook related to sidelink communications using combination DCIs. That is, the base station may include the information related to transmitting sidelink feedback to the base station (e.g., indication of uplink resources or a trigger bit for a Type 3 HARQ codebook) in a non-empty grant DCI to the transmitting UE or a non-empty grant DCI to the receiving UE.

Figure 4:
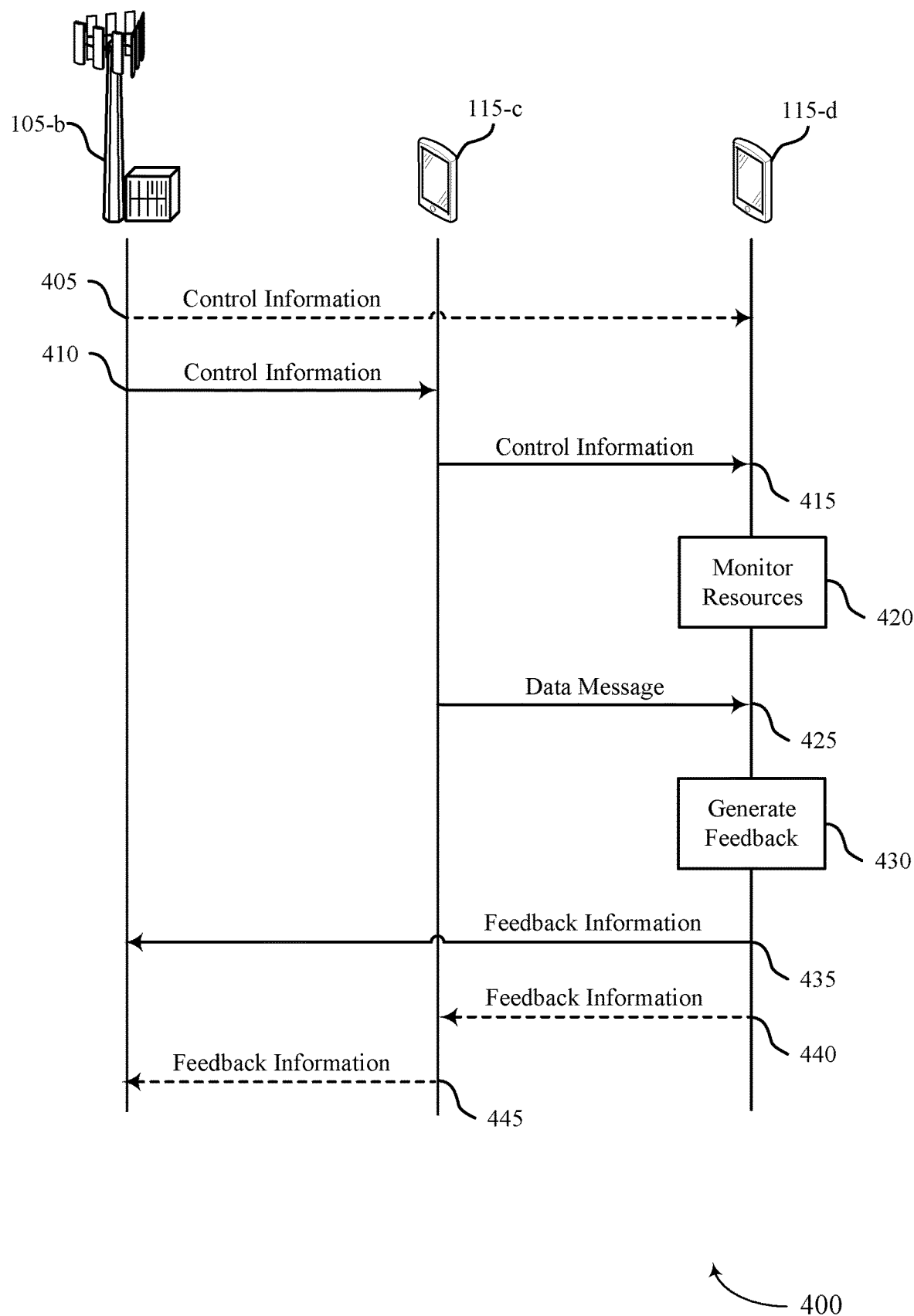
FIG. 4 illustrates an example of a process flow that supports techniques for collecting sidelink channel feedback from a receiving UE in accordance with aspects of the present disclosure.

FIG. 4 illustrates an example of a process flow 400 that supports techniques for collecting sidelink channel feedback from a receiving UE in accordance with aspects of the present disclosure. In some examples, the process flow 400 may implement or be implemented by aspects of a wireless communications system 100, a wireless communications system 200, or a feedback scheme 300. For example, the process flow 400 may include a base station 105-*b*, a UE 115-*c*, and a UE 115-*d* which may be examples of a base station 105 and a UE 115 as described with reference to FIGS. 1 and 2. The process flow may involve transmitting, by a receiving UE (e.g., a UE 115-*d*), feedback related to a sidelink transmission from a transmitting UE (e.g., a UE 115-*c*) directly to a base station (e.g., a base station 105-*b*). Alternative examples of the following may be implemented, where some steps are performed in a different order then described or are not performed at all. In some cases, steps may include additional features not mentioned below, or further steps may be added.

At 405, the UE 115-*d* may potentially receive control information from the base station 105-*b*. In some examples, the control information may be included in DCI. The control information may include a request for the UE 115-*d* to provide feedback for one or more sidelink reception processes. The control information may additionally include an indication of a set of uplink resources.

At 410, the UE 115-*c* may potentially receive control information from the base station 105-*b*. The control information may be included in DCI. In some examples, the control information may include a HARQ process ID as well as an indication of a set of PSSCH resources. If the UE 115-*d* does not receive the DCI at 405, the control information may also include an indication of the set of uplink resources.

At 415, the UE 115-*c* may transmit control information to the UE 115-*d*. The control information may be carried in SCI. The control information may include an indication of the set of PSSCH resources and a sidelink process ID. If the UE does not receive the DCI at 405, the control information may include one or more of the indication of the set of uplink resources, the HARQ process ID, an SAI, a group index, an NFI, or a trigger bit for a HARQ Type 3 codebook.

At 420, the UE 115-*d* may monitor the set of PSSCH resources and receive one or more data messages from the UE 115-*c* over the set of PSSCH resources at 425.

At 430, the UE 115-*d* may generate feedback information for the one or more data message. For example, the UE 115-*d* may construct a HARQ codebook for the one or more data messages. The UE 115-*d* may construct the HARQ codebook based on one or more of the sidelink process ID, the HARQ process ID, the SAI, the group index, the NFI, or the trigger bit for a HARQ Type 3 codebook. That is, the UE 115-*d* may construct a Type 1 HARQ codebook, a Type 2 HARQ codebook, an enhanced Type 2 HARQ codebook, or a Type 3 HARQ codebook.

At 435, the UE 115-*d* may transmit the feedback information to the base station 105-*b*. In some examples, the feedback information may include the HARQ codebook constructed at 430. In some examples, the feedback information may indicate that the UE 115-*d* received and decoded the one or more data messages successfully (e.g., ACK feedback). Alternatively, the feedback information may indicate that the UE 115-*d* received and decoded unsuccessfully (e.g., NACK).

Additionally or alternatively, at 440, the UE 115-*d* may transmit the feedback information to the UE 115-*c* and the UE 115-*c* may transmit the feedback information to the base station 105-*b* over a set of uplink resources at 445. In some examples, the UE 115-*c* may use the same time and frequency resources to transmit the feedback information to the base station 105-*b* as the UE 115-*d* uses to transmit the feedback information to the base station 105-*b*. In such case, the base station 105-*b* may combine the feedback information from the UE 115-*c* with the feedback information from the UE 115-*c*.

Figure 5:
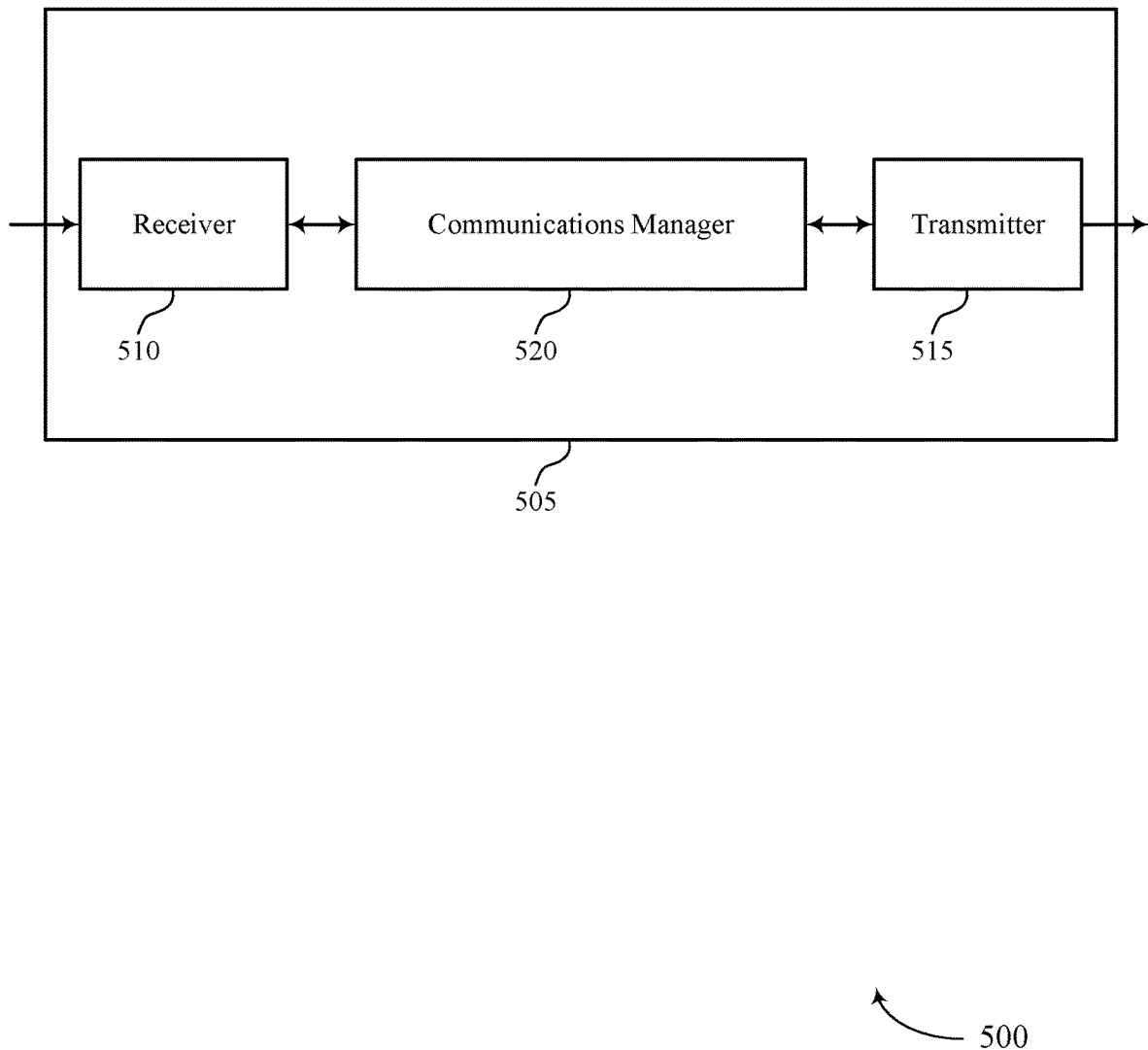
FIGS. 5 and 6 show block diagrams of devices that support techniques for collecting sidelink channel feedback from a receiving UE in accordance with aspects of the present disclosure.

FIG. 5 shows a block diagram 500 of a device 505 that supports techniques for collecting sidelink channel feedback from a receiving UE in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for collecting sidelink channel feedback from a receiving UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for collecting sidelink channel feedback from a receiving UE). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for collecting sidelink channel feedback from a receiving UE as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for receiving, at a first UE, an indication of sidelink resources for communicating with a second UE and an indication of uplink resources for providing sidelink feedback information to a base station. The communications manager 520 may be configured as or otherwise support a means for monitoring the indicated sidelink resources for a sidelink shared channel transmission. The communications manager 520 may be configured as or otherwise support a means for generating the sidelink feedback information for the sidelink shared channel transmission in accordance with the monitoring. The communications manager 520 may be configured as or otherwise support a means for transmitting the sidelink feedback information for the sidelink shared channel transmission to the base station over the indicated uplink resources.

For example, the communications manager 520 may be configured as or otherwise support a means for transmitting, to a first UE, an indication of sidelink resources for communication with a second UE and an indication of uplink resources for providing sidelink feedback information to a base station. The communications manager 520 may be configured as or otherwise support a means for transmitting, by the second UE, a sidelink shared channel transmission over the indicated sidelink resources to the first UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption. By identifying a mapping between sidelink process IDs and HARQ process IDs, the device 505 may minimize signaling and processing related to sidelink HARQ processes.

Figure 6:
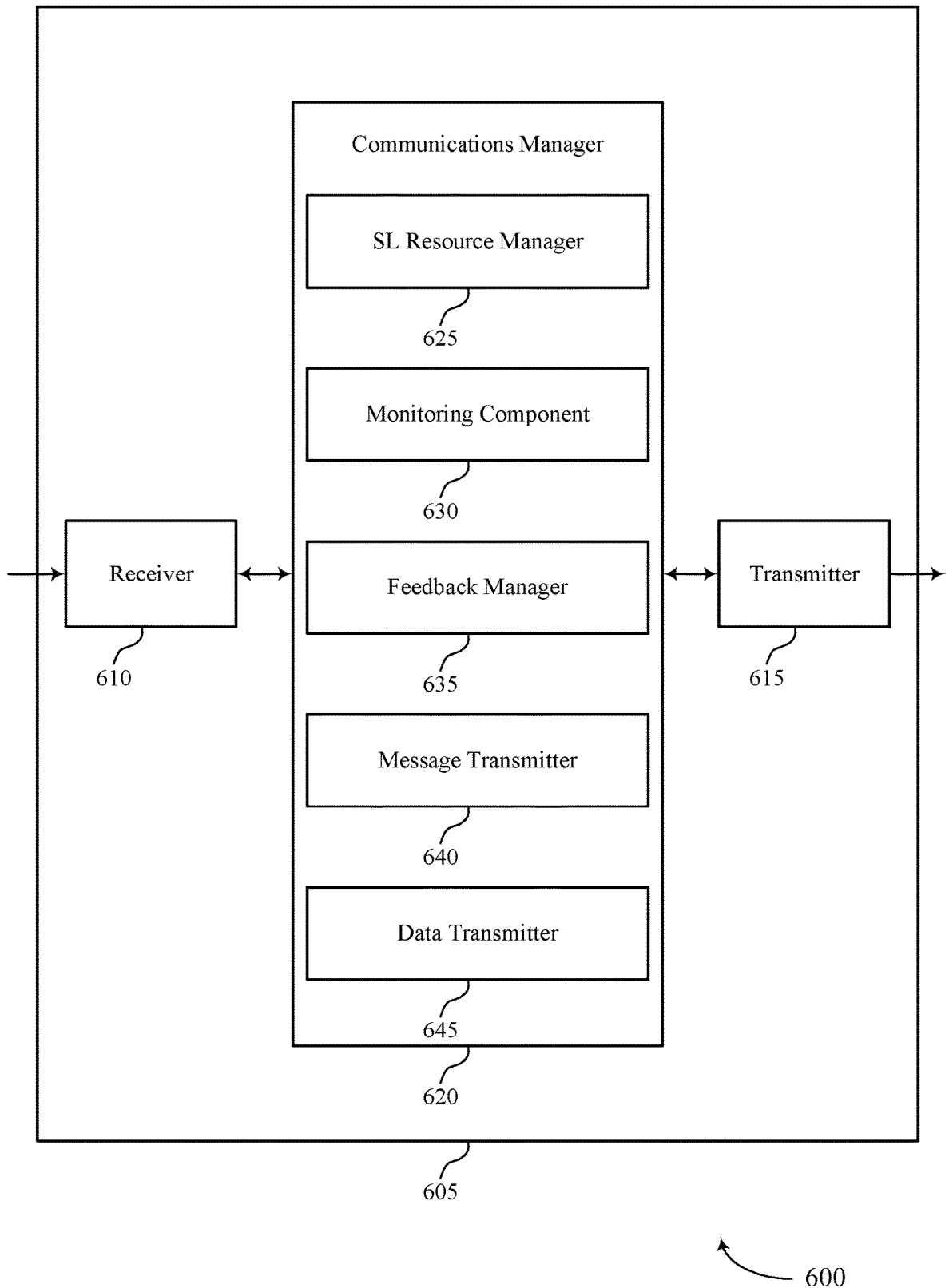

FIG. 6 shows a block diagram 600 of a device 605 that supports techniques for collecting sidelink channel feedback from a receiving UE in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for collecting sidelink channel feedback from a receiving UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for collecting sidelink channel feedback from a receiving UE). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for collecting sidelink channel feedback from a receiving UE as described herein. For example, the communications manager 620 may include an SL resource manager 625, a monitoring component 630, a feedback manager 635, a message transmitter 640, a data transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The SL resource manager 625 may be configured as or otherwise support a means for receiving, at a first UE, an indication of sidelink resources for communicating with a second UE and an indication of uplink resources for providing sidelink feedback information to a base station. The monitoring component 630 may be configured as or otherwise support a means for monitoring the indicated sidelink resources for a sidelink shared channel transmission. The feedback manager 635 may be configured as or otherwise support a means for generating the sidelink feedback information for the sidelink shared channel transmission in accordance with the monitoring. The message transmitter 640 may be configured as or otherwise support a means for transmitting the sidelink feedback information for the sidelink shared channel transmission to the base station over the indicated uplink resources.

The SL resource manager 625 may be configured as or otherwise support a means for transmitting, to a first UE, an indication of sidelink resources for communication with a second UE and an indication of uplink resources for providing sidelink feedback information to a base station. The data transmitter 645 may be configured as or otherwise support a means for transmitting, by the second UE, a sidelink shared channel transmission over the indicated sidelink resources to the first UE.

Figure 7:
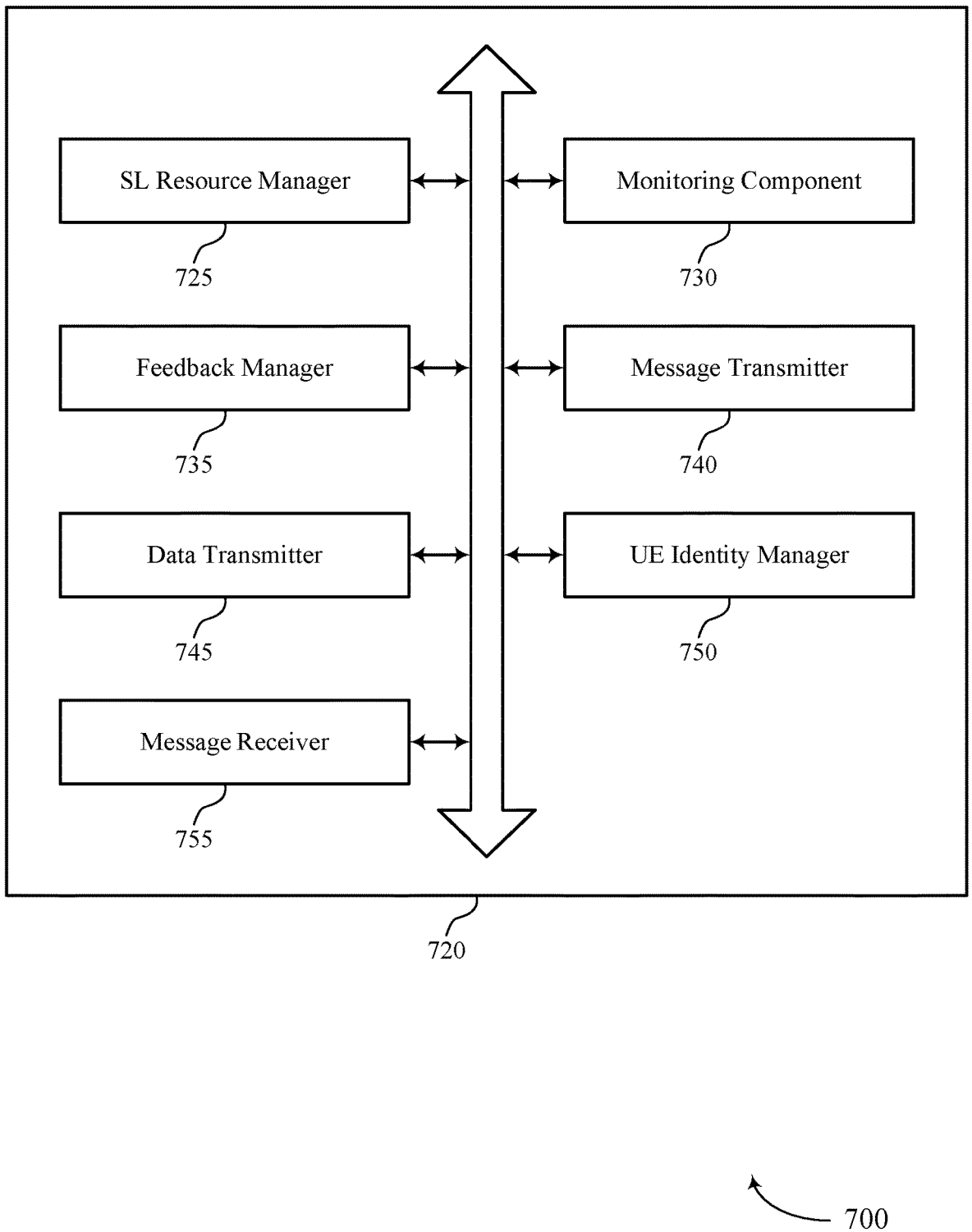
FIG. 7 shows a block diagram of a communications manager that supports techniques for collecting sidelink channel feedback from a receiving UE in accordance with aspects of the present disclosure.

FIG. 7 shows a block diagram 700 of a communications manager 720 that supports techniques for collecting sidelink channel feedback from a receiving UE in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for collecting sidelink channel feedback from a receiving UE as described herein. For example, the communications manager 720 may include an SL resource manager 725, a monitoring component 730, a feedback manager 735, a message transmitter 740, a data transmitter 745, a UE identity manager 750, a message receiver 755, or any combination thereof. Each of these components may communicate, directly or indirectly, with one another (e.g., via one or more buses).

The SL resource manager 725 may be configured as or otherwise support a means for receiving, at a first UE, an indication of sidelink resources for communicating with a second UE and an indication of uplink resources for providing sidelink feedback information to a base station. The monitoring component 730 may be configured as or otherwise support a means for monitoring the indicated sidelink resources for a sidelink shared channel transmission. The feedback manager 735 may be configured as or otherwise support a means for generating the sidelink feedback information for the sidelink shared channel transmission in accordance with the monitoring. The message transmitter 740 may be configured as or otherwise support a means for transmitting the sidelink feedback information for the sidelink shared channel transmission to the base station over the indicated uplink resources.

In some examples, to support receiving the indication of uplink resources, the SL resource manager 725 may be configured as or otherwise support a means for receiving SCI from the second UE, the SCI including the indication of uplink resources.

In some examples, the SCI further includes the indication of sidelink resources. In some examples, the SCI further includes a HARQ process ID, a sidelink process ID, an SAI, a group index, an NFI, a trigger bit, or any combination thereof.

In some examples, to support generating the sidelink feedback information, the feedback manager 735 may be configured as or otherwise support a means for generating a HARQ codebook according to one or more of: the HARQ process ID, the sidelink process ID, the SAI, the group index, the NFI, or the trigger bit.

In some examples, to support receiving the indication of uplink resources, the SL resource manager 725 may be configured as or otherwise support a means for receiving DCI directly from the base station, the DCI including the indication of uplink resources.

In some examples, the feedback manager 735 may be configured as or otherwise support a means for receiving a message instructing the first UE to determine whether communication between the first UE and the second UE is blocked, where transmitting the sidelink feedback information for the sidelink shared channel transmission to the base station over the indicated uplink resources is based on determining whether communication between the first UE and the second UE is blocked.

In some examples, the feedback manager 735 may be configured as or otherwise support a means for receiving, by the first UE, an indication of a an order of attempt sequence for performing multiple transmissions of the sidelink feedback information using either uplink resources or sidelink resources, where transmitting the sidelink feedback information for the sidelink shared channel transmission to the base station over the indicated uplink resources is based on the order of attempt sequence.

In some examples, the feedback manager 735 may be configured as or otherwise support a means for identifying a mapping between one or more HARQ process IDs and one or more sidelink process IDs.

In some examples, the message transmitter 740 may be configured as or otherwise support a means for transmitting the sidelink feedback information for the sidelink shared channel transmission to the second UE.

In some examples, the SL resource manager 725 may be configured as or otherwise support a means for transmitting, to a first UE, an indication of sidelink resources for communication with a second UE and an indication of uplink resources for providing sidelink feedback information to a base station. The data transmitter 745 may be configured as or otherwise support a means for transmitting, by the second UE, a sidelink shared channel transmission over the indicated sidelink resources to the first UE.

In some examples, to support transmitting the indication of uplink resources, the SL resource manager 725 may be configured as or otherwise support a means for transmitting SCI to the first UE, the SCI including the indication of the uplink resources.

In some examples, the SCI further includes the indication of sidelink resources. In some examples, the SCI further includes a HARQ process ID, a sidelink process ID, an SAI, a group index, an NFI, a trigger bit, or any combination thereof.

In some examples, the UE identity manager 750 may be configured as or otherwise support a means for receiving an indication of one or more UE IDs from the base station, the one or more UE IDs corresponding to at least the first UE, where transmitting the indication of uplink resources is based on receiving the indication of the one or more UE IDs.

In some examples, to support receiving one or more UE IDs from the base station, the UE identity manager 750 may be configured as or otherwise support a means for receiving DCI from the base station, the DCI including the indication of the one or more UE IDs.

In some examples, the feedback manager 735 may be configured as or otherwise support a means for receiving a message configuring the second UE with a mapping between a set of UE IDs and a set of HARQ process IDs, where transmitting the indication of uplink resources is based on receiving the message.

In some examples, the feedback manager 735 may be configured as or otherwise support a means for identifying a mapping between one or more HARQ process IDs and one or more sidelink process IDs.

In some examples, the message receiver 755 may be configured as or otherwise support a means for receiving the sidelink feedback information for the sidelink shared channel transmission from the first UE.

Figure 8:
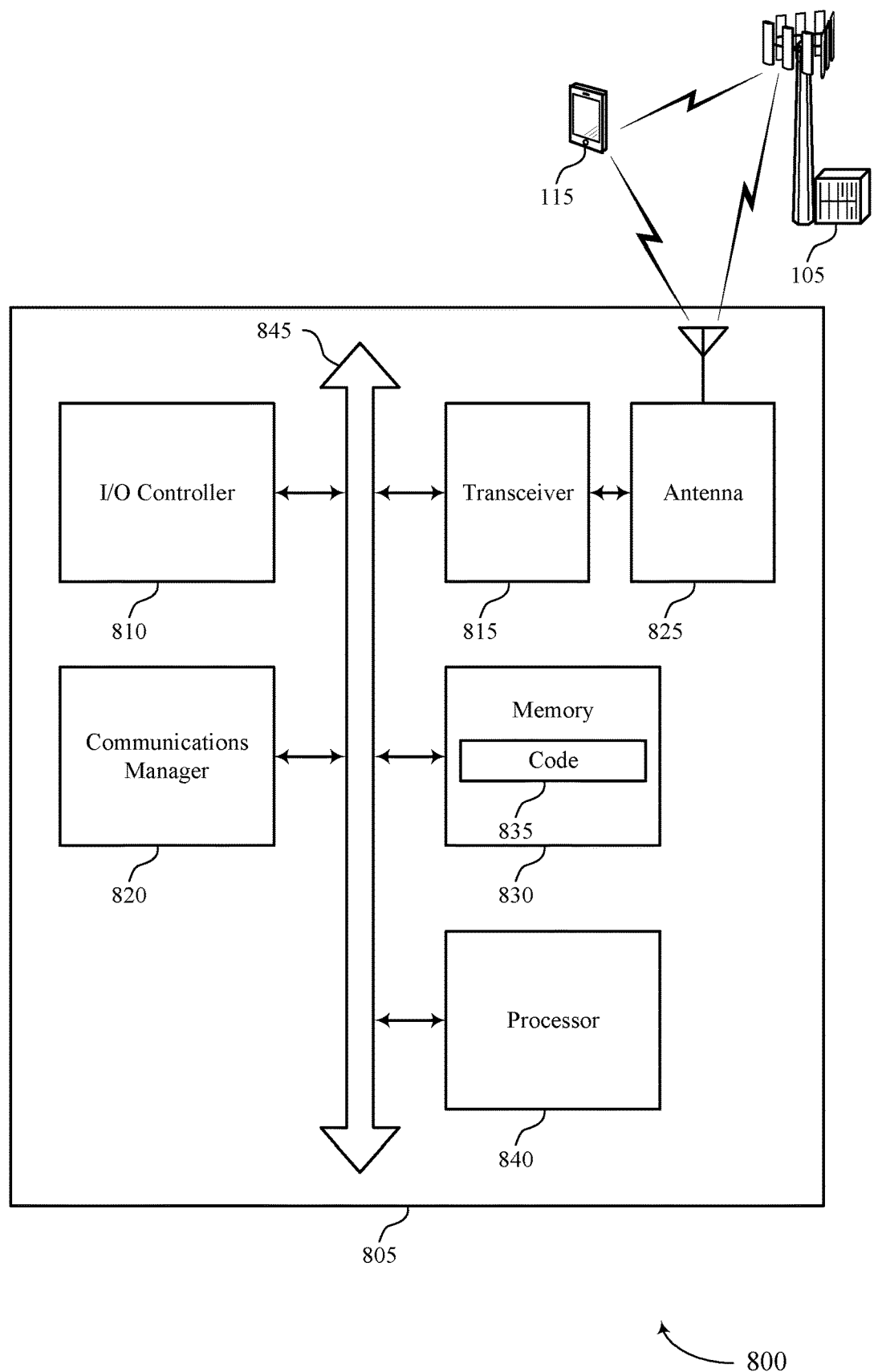
FIG. 8 shows a diagram of a system including a device that supports techniques for collecting sidelink channel feedback from a receiving UE in accordance with aspects of the present disclosure.

FIG. 8 shows a diagram of a system 800 including a device 805 that supports techniques for collecting sidelink channel feedback from a receiving UE in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for collecting sidelink channel feedback from a receiving UE). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for receiving, at a first UE, an indication of sidelink resources for communicating with a second UE and an indication of uplink resources for providing sidelink feedback information to a base station. The communications manager 820 may be configured as or otherwise support a means for monitoring the indicated sidelink resources for a sidelink shared channel transmission. The communications manager 820 may be configured as or otherwise support a means for generating the sidelink feedback information for the sidelink shared channel transmission in accordance with the monitoring. The communications manager 820 may be configured as or otherwise support a means for transmitting the sidelink feedback information for the sidelink shared channel transmission to the base station over the indicated uplink resources.

For example, the communications manager 820 may be configured as or otherwise support a means for transmitting, to a first UE, an indication of sidelink resources for communication with a second UE and an indication of uplink resources for providing sidelink feedback information to a base station. The communications manager 820 may be configured as or otherwise support a means for transmitting, by the second UE, a sidelink shared channel transmission over the indicated sidelink resources to the first UE.

By including or configuring the communications manager 820 in accordance with examples as described herein, the device 805 may support techniques for improved communication reliability, reduced latency, and improved coordination between devices. The methods described herein may allow the device 805 to transmit feedback information related to sidelink communications directly to the base station. Using these methods, the device 805 may provide feedback to the base station using two different paths which may increase reliability of the sidelink feedback information. In addition, in some examples, transmitting feedback information directly to the base station (one-hop) may take less time than relaying the feedback information to the base station through another device 805 (two-hop) which may reduce latency in the system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for collecting sidelink channel feedback from a receiving UE as described herein, or the processor 840 and the memory 830 may be otherwise configured to perform or support such operations.

Figure 9:
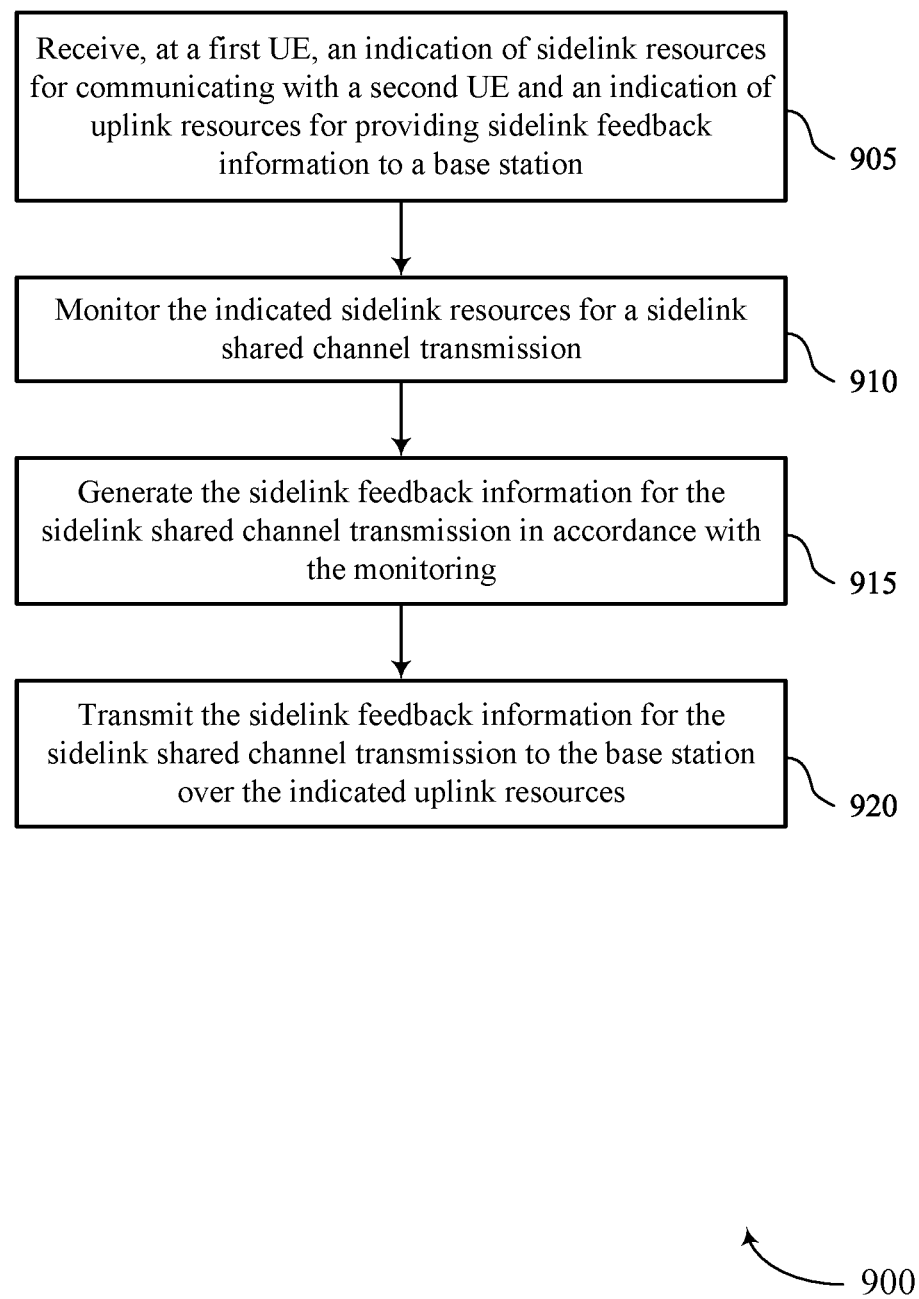
FIGS. 9 through 14 show flowcharts illustrating methods that support techniques for collecting sidelink channel feedback from a receiving UE in accordance with aspects of the present disclosure.

FIG. 9 shows a flowchart illustrating a method 900 that supports techniques for collecting sidelink channel feedback from a receiving UE in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, at a first UE, an indication of sidelink resources for communicating with a second UE and an indication of uplink resources for providing sidelink feedback information to a base station. The operations of 905 may be performed in accordance with examples as disclosed herein. In some examples, aspects of the operations of 905 may be performed by an SL resource manager 725 as described with reference to FIG. 7.

At 910, the method may include monitoring the indicated sidelink resources for a sidelink shared channel transmission. The operations of 910 may be performed in accordance with examples as disclosed herein. In some examples, aspects of the operations of 910 may be performed by a monitoring component 730 as described with reference to FIG. 7.

At 915, the method may include generating the sidelink feedback information for the sidelink shared channel transmission in accordance with the monitoring. The operations of 915 may be performed in accordance with examples as disclosed herein. In some examples, aspects of the operations of 915 may be performed by a feedback manager 735 as described with reference to FIG. 7.

At 920, the method may include transmitting the sidelink feedback information for the sidelink shared channel transmission to the base station over the indicated uplink resources. The operations of 920 may be performed in accordance with examples as disclosed herein. In some examples, aspects of the operations of 920 may be performed by a message transmitter 740 as described with reference to FIG. 7.

Figure 10:
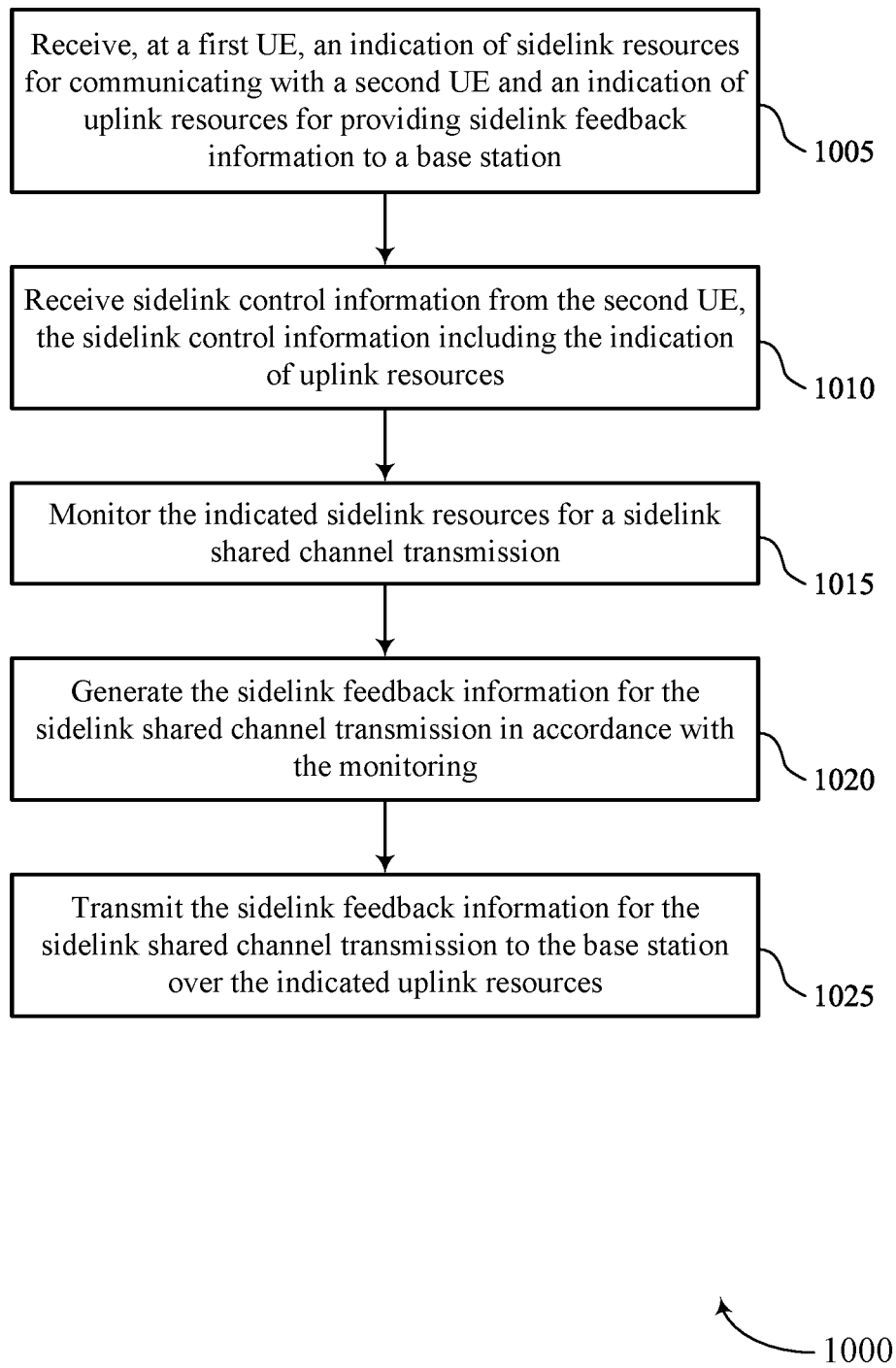

FIG. 10 shows a flowchart illustrating a method 1000 that supports techniques for collecting sidelink channel feedback from a receiving UE in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, at a first UE, an indication of sidelink resources for communicating with a second UE and an indication of uplink resources for providing sidelink feedback information to a base station. The operations of 1005 may be performed in accordance with examples as disclosed herein. In some examples, aspects of the operations of 1005 may be performed by an SL resource manager 725 as described with reference to FIG. 7.

At 1010, the method may include receiving SCI from the second UE, the SCI including the indication of uplink resources. The operations of 1010 may be performed in accordance with examples as disclosed herein. In some examples, aspects of the operations of 1010 may be performed by an SL resource manager 725 as described with reference to FIG. 7.

At 1015, the method may include monitoring the indicated sidelink resources for a sidelink shared channel transmission. The operations of 1015 may be performed in accordance with examples as disclosed herein. In some examples, aspects of the operations of 1015 may be performed by a monitoring component 730 as described with reference to FIG. 7.

At 1020, the method may include generating the sidelink feedback information for the sidelink shared channel transmission in accordance with the monitoring. The operations of 1020 may be performed in accordance with examples as disclosed herein. In some examples, aspects of the operations of 1020 may be performed by a feedback manager 735 as described with reference to FIG. 7.

At 1025, the method may include transmitting the sidelink feedback information for the sidelink shared channel transmission to the base station over the indicated uplink resources. The operations of 1025 may be performed in accordance with examples as disclosed herein. In some examples, aspects of the operations of 1025 may be performed by a message transmitter 740 as described with reference to FIG. 7.

Figure 11:
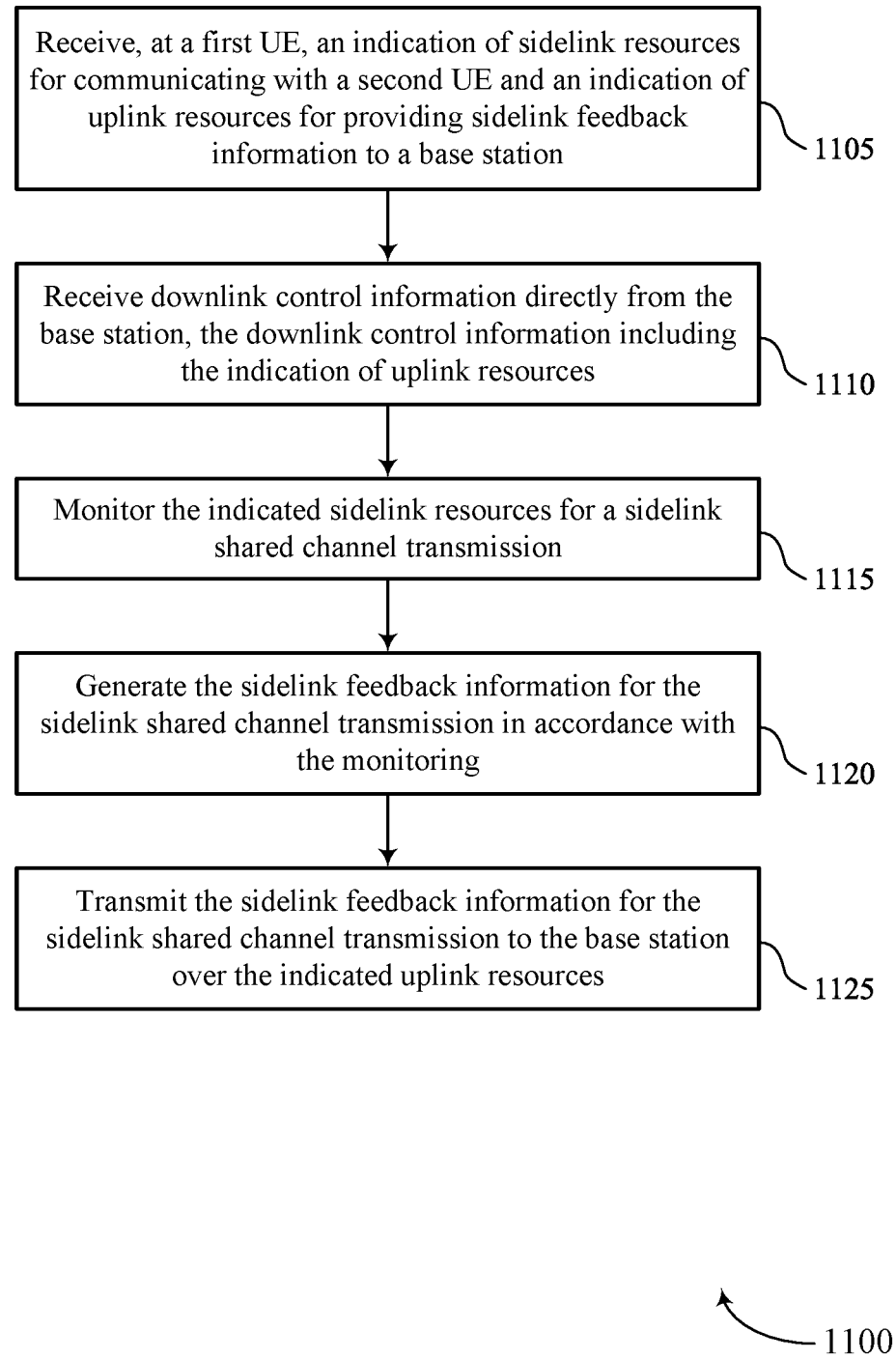

FIG. 11 shows a flowchart illustrating a method 1100 that supports techniques for collecting sidelink channel feedback from a receiving UE in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, at a first UE, an indication of sidelink resources for communicating with a second UE and an indication of uplink resources for providing sidelink feedback information to a base station. The operations of 1105 may be performed in accordance with examples as disclosed herein. In some examples, aspects of the operations of 1105 may be performed by an SL resource manager 725 as described with reference to FIG. 7.

At 1110, the method may include receiving DCI directly from the base station, the DCI including the indication of uplink resources. The operations of 1110 may be performed in accordance with examples as disclosed herein. In some examples, aspects of the operations of 1110 may be performed by an SL resource manager 725 as described with reference to FIG. 7.

At 1115, the method may include monitoring the indicated sidelink resources for a sidelink shared channel transmission. The operations of 1115 may be performed in accordance with examples as disclosed herein. In some examples, aspects of the operations of 1115 may be performed by a monitoring component 730 as described with reference to FIG. 7.

At 1120, the method may include generating the sidelink feedback information for the sidelink shared channel transmission in accordance with the monitoring. The operations of 1120 may be performed in accordance with examples as disclosed herein. In some examples, aspects of the operations of 1120 may be performed by a feedback manager 735 as described with reference to FIG. 7.

At 1125, the method may include transmitting the sidelink feedback information for the sidelink shared channel transmission to the base station over the indicated uplink resources. The operations of 1125 may be performed in accordance with examples as disclosed herein. In some examples, aspects of the operations of 1125 may be performed by a message transmitter 740 as described with reference to FIG. 7.

Figure 12:
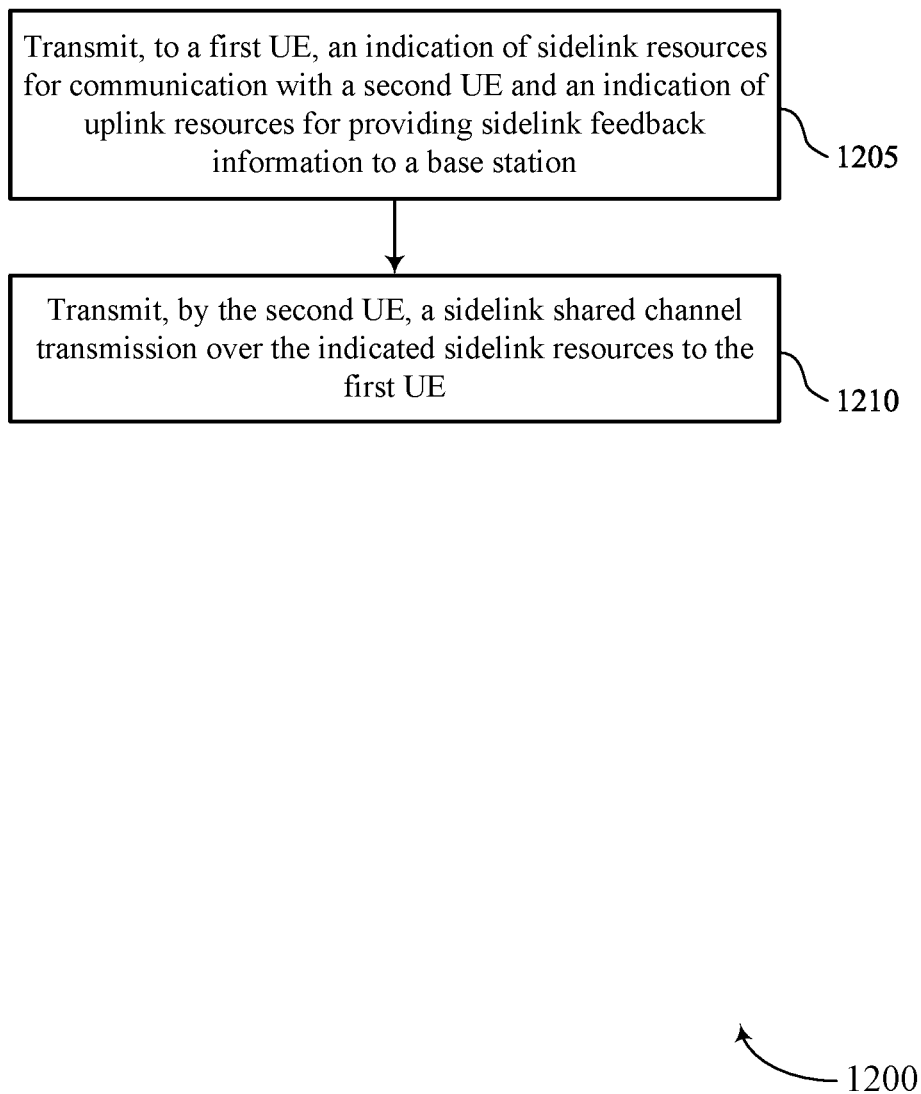

FIG. 12 shows a flowchart illustrating a method 1200 that supports techniques for collecting sidelink channel feedback from a receiving UE in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting, to a first UE, an indication of sidelink resources for communication with a second UE and an indication of uplink resources for providing sidelink feedback information to a base station. The operations of 1205 may be performed in accordance with examples as disclosed herein. In some examples, aspects of the operations of 1205 may be performed by an SL resource manager 725 as described with reference to FIG. 7.

At 1210, the method may include transmitting, by the second UE, a sidelink shared channel transmission over the indicated sidelink resources to the first UE. The operations of 1210 may be performed in accordance with examples as disclosed herein. In some examples, aspects of the operations of 1210 may be performed by a data transmitter 745 as described with reference to FIG. 7.

Figure 13:
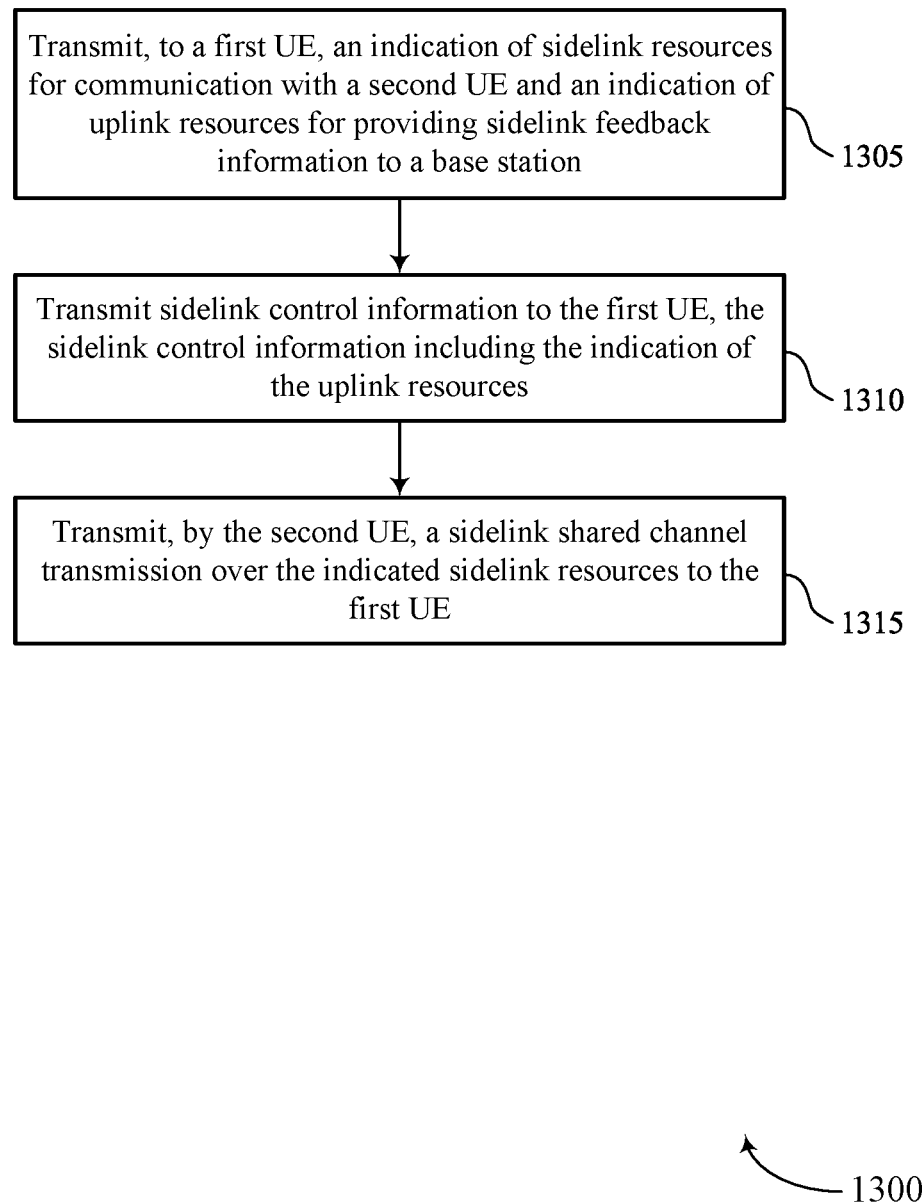

FIG. 13 shows a flowchart illustrating a method 1300 that supports techniques for collecting sidelink channel feedback from a receiving UE in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a first UE, an indication of sidelink resources for communication with a second UE and an indication of uplink resources for providing sidelink feedback information to a base station. The operations of 1305 may be performed in accordance with examples as disclosed herein. In some examples, aspects of the operations of 1305 may be performed by an SL resource manager 725 as described with reference to FIG. 7.

At 1310, the method may include transmitting SCI to the first UE, the SCI including the indication of the uplink resources. The operations of 1310 may be performed in accordance with examples as disclosed herein. In some examples, aspects of the operations of 1310 may be performed by an SL resource manager 725 as described with reference to FIG. 7.

At 1315, the method may include transmitting, by the second UE, a sidelink shared channel transmission over the indicated sidelink resources to the first UE. The operations of 1315 may be performed in accordance with examples as disclosed herein. In some examples, aspects of the operations of 1315 may be performed by a data transmitter 745 as described with reference to FIG. 7.

Figure 14:
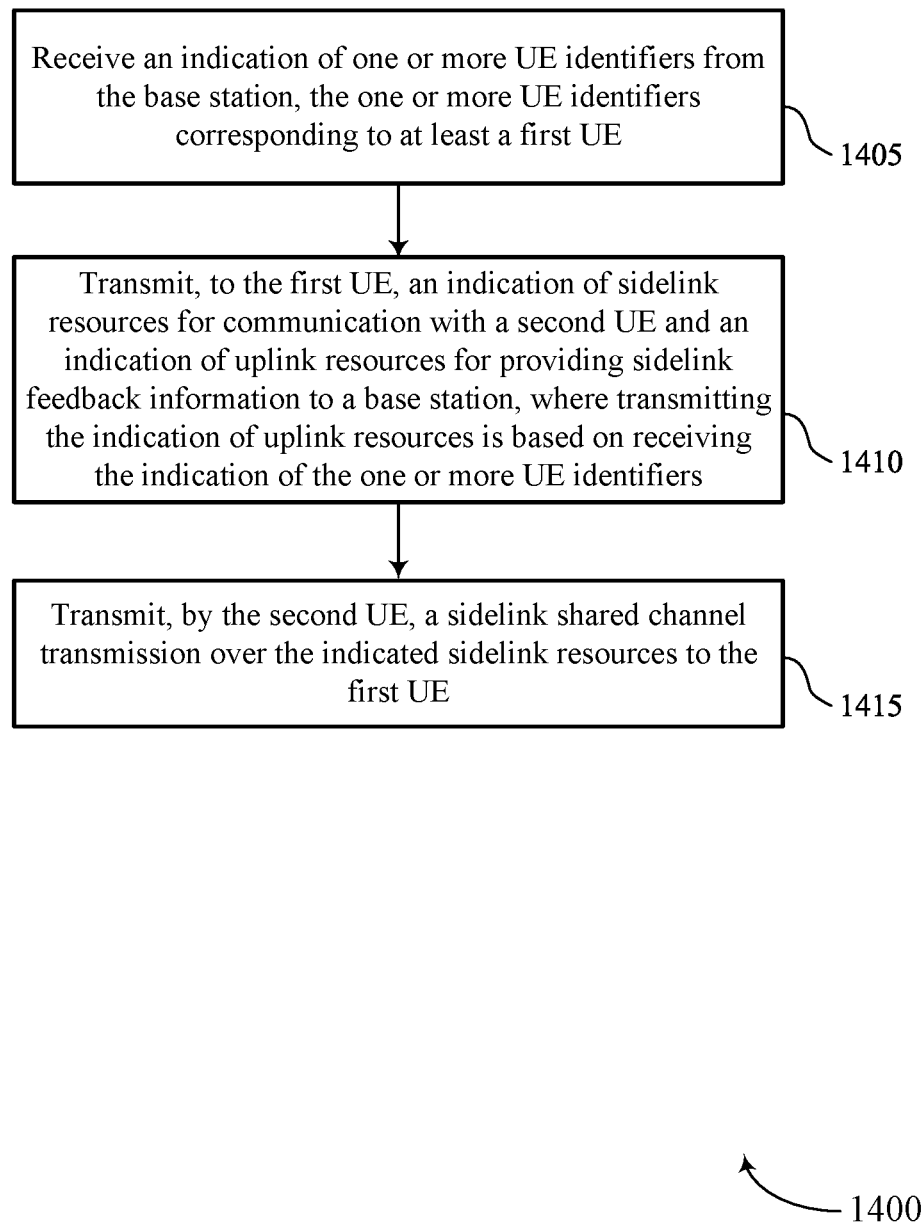

FIG. 14 shows a flowchart illustrating a method 1400 that supports techniques for collecting sidelink channel feedback from a receiving UE in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving an indication of one or more UE IDs from the base station, the one or more UE IDs corresponding to at least a first UE. The operations of 1405 may be performed in accordance with examples as disclosed herein. In some examples, aspects of the operations of 1405 may be performed by a UE identity manager 750 as described with reference to FIG. 7.

At 1410, the method may include transmitting, to the first UE, an indication of sidelink resources for communication with a second UE and an indication of uplink resources for providing sidelink feedback information to a base station, where transmitting the indication of uplink resources is based on receiving the indication of the one or more UE IDs. The operations of 1410 may be performed in accordance with examples as disclosed herein. In some examples, aspects of the operations of 1410 may be performed by an SL resource manager 725 as described with reference to FIG. 7.

At 1415, the method may include transmitting, by the second UE, a sidelink shared channel transmission over the indicated sidelink resources to the first UE. The operations of 1415 may be performed in accordance with examples as disclosed herein. In some examples, aspects of the operations of 1415 may be performed by a data transmitter 745 as described with reference to FIG. 7.

The following provides an overview of aspects of the present disclosure:

Aspect 1: A method of wireless communications, comprising: receiving, at a first UE, an indication of sidelink resources for communicating with a second UE and an indication of uplink resources for providing sidelink feedback information to a base station; monitoring the indicated sidelink resources for a sidelink shared channel transmission; generating the sidelink feedback information for the sidelink shared channel transmission in accordance with the monitoring; and transmitting the sidelink feedback information for the sidelink shared channel transmission to the base station over the indicated uplink resources.

Aspect 2: The method of aspect 1, wherein receiving the indication of uplink resources further comprises: receiving SCI from the second UE, the SCI comprising the indication of uplink resources.

Aspect 3: The method of aspect 2, wherein the SCI further comprises the indication of sidelink resources.

Aspect 4: The method of any of aspects 2 through 3, wherein the SCI further comprises one or more of: a HARQ process ID, a sidelink process ID, a SAI, a group index, a NFI, a trigger bit, or any combination thereof.

Aspect 5: The method of aspect 4, wherein generating the sidelink feedback information further comprises: generating a HARQ codebook according to one or more of: the HARQ process ID, the sidelink process ID, the SAI, the group index, the NFI, or the trigger bit.

Aspect 6: The method of any of aspects 1 through 5, wherein receiving the indication of uplink resources further comprises: receiving DCI directly from the base station, the DCI comprising the indication of uplink resources.

Aspect 7: The method of any of aspects 1 through 6, further comprising: receiving a message instructing the first UE to determine whether communication between the first UE and the second UE is blocked, wherein transmitting the sidelink feedback information for the sidelink shared channel transmission to the base station over the indicated uplink resources is based at least in part on determining whether communication between the first UE and the second UE is blocked.

Aspect 8: The method of any of aspects 1 through 7, further comprising: receiving, by the first UE, an indication of a an order of attempt sequence for performing multiple transmissions of the sidelink feedback information using either uplink resources or sidelink resources, wherein transmitting the sidelink feedback information for the sidelink shared channel transmission to the base station over the indicated uplink resources is based at least in part on the order of attempt sequence.

Aspect 9: The method of any of aspects 1 through 8, further comprising: identifying a mapping between one or more HARQ process IDs and one or more sidelink process IDs.

Aspect 10: The method of any of aspects 1 through 9, further comprising: transmitting the sidelink feedback information for the sidelink shared channel transmission to the second UE.

Aspect 11: A method of wireless communications, comprising: transmitting, to a first UE, an indication of sidelink resources for communication with a second UE and an indication of uplink resources for providing sidelink feedback information to a base station; and transmitting, by the second UE, a sidelink shared channel transmission over the indicated sidelink resources to the first UE.

Aspect 12: The method of aspect 11, wherein transmitting the indication of uplink resources further comprises: transmitting SCI to the first UE, the SCI comprising the indication of the uplink resources.

Aspect 13: The method of aspect 12, wherein the SCI further comprises the indication of sidelink resources.

Aspect 14: The method of any of aspects 12 through 13, wherein the SCI further comprises one or more of: a HARQ process ID, a sidelink process ID, a SAI, a group index, a NFI, a trigger bit, or any combination thereof.

Aspect 15: The method of any of aspects 11 through 14, further comprising: receiving an indication of one or more UE IDs from the base station, the one or more UE IDs corresponding to at least the first UE, wherein transmitting the indication of uplink resources is based at least in part on receiving the indication of the one or more UE IDs.

Aspect 16: The method of aspect 15, wherein receiving one or more UE IDs from the base station further comprises: receiving DCI from the base station, the DCI comprising the indication of the one or more UE IDs.

Aspect 17: The method of any of aspects 11 through 16, further comprising: receiving a message configuring the second UE with a mapping between a set of UE IDs and a set of HARQ process IDs, wherein transmitting the indication of uplink resources is based at least in part on receiving the message.

Aspect 18: The method of any of aspects 11 through 17, further comprising: identifying a mapping between one or more HARQ process IDs and one or more sidelink process IDs.

Aspect 19: The method of any of aspects 11 through 18, further comprising: receiving the sidelink feedback information for the sidelink shared channel transmission from the first UE.

Aspect 20: An apparatus comprising a processor; memory coupled with the processor; and instructions stored in the memory and executable by the processor to cause the apparatus to perform a method of any of aspects 1 through 10.

Aspect 21: An apparatus comprising at least one means for performing a method of any of aspects 1 through 10.

Aspect 22: A non-transitory computer-readable medium storing code the code comprising instructions executable by a processor to perform a method of any of aspects 1 through 10.

Aspect 23: An apparatus comprising a processor; memory coupled with the processor; and instructions stored in the memory and executable by the processor to cause the apparatus to perform a method of any of aspects 11 through 19.

Aspect 24: An apparatus comprising at least one means for performing a method of any of aspects 11 through 19.

Aspect 25: A non-transitory computer-readable medium storing code the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memories storing processor-executable code; and
one or more processors coupled with the one or more memories and individually or collectively operable to execute the code to cause the apparatus to:
receive, at a first user equipment (UE) and from a second UE, both an indication of sidelink resources for reception of a sidelink shared channel transmission from the second UE and an indication of uplink resources for providing sidelink feedback information associated with the sidelink shared channel transmission to a network device;
monitor, at the first UE, the indicated sidelink resources for the sidelink shared channel transmission;
generate, at the first UE, the sidelink feedback information associated with the sidelink shared channel transmission in accordance with the monitoring;
obtain, at the first UE and based on generating the sidelink feedback information, a state of a sidelink communication link between the first UE and the second UE, the state indicating that the sidelink communication link is blocked; and
transmit, from the first UE and based on the state of the sidelink communication link indicating that the sidelink communication link is blocked, the sidelink feedback information associated with the sidelink shared channel transmission to the network device via an uplink communication link between the first UE and the network device using the indicated uplink resources, wherein the sidelink feedback information indicates whether the sidelink shared channel transmission is decoded by the first UE.

2. The apparatus of claim 1, wherein, to receive the indication of the uplink resources, the one or more processors are individually or collectively operable to execute the code to cause the apparatus to:
receive sidelink control information from the second UE, the sidelink control information comprising the indication of the uplink resources.

3. The apparatus of claim 2, wherein the sidelink control information further comprises the indication of the sidelink resources.

4. The apparatus of claim 2, wherein the sidelink control information further comprises one or more of:
a hybrid automatic repeat request process identifier, a sidelink process identifier, a sidelink assignment index, a group index, a new feedback indicator, a trigger bit, or any combination thereof.

5. The apparatus of claim 4, wherein, to generate the sidelink feedback information, the one or more processors are individually or collectively operable to execute the code to cause the apparatus to:
generate a hybrid automatic repeat request codebook according to one or more of:
the hybrid automatic repeat request process identifier, the sidelink process identifier, the sidelink assignment index, the group index, the new feedback indicator, or the trigger bit.

6. The apparatus of claim 1, wherein the one or more processors are individually or collectively further operable to execute the code to cause the apparatus to:
receive a message instructing the first UE to obtain the state of the sidelink communication link, wherein transmitting the sidelink feedback information for the sidelink shared channel transmission to the network device using the indicated uplink resources is based at least in part on the message, and wherein obtaining the state of the sidelink communication link comprises determining that communication between the first UE and the second UE is blocked.

7. The apparatus of claim 1, wherein the one or more processors are individually or collectively further operable to execute the code to cause the apparatus to:
receive, by the first UE, an indication of an order of attempt sequence for performing multiple transmissions of the sidelink feedback information using either the uplink resources or the sidelink resources, wherein transmitting the sidelink feedback information for the sidelink shared channel transmission to the network device using the indicated uplink resources is based at least in part on the order of attempt sequence.

8. The apparatus of claim 1, wherein the one or more processors are individually or collectively further operable to execute the code to cause the apparatus to:
identify a mapping between one or more hybrid automatic repeat request process identifiers and one or more sidelink process identifiers.

9. The apparatus of claim 1, wherein the one or more processors are individually or collectively further operable to execute the code to cause the apparatus to:
transmit the sidelink feedback information for the sidelink shared channel transmission to the second UE.

10. An apparatus, comprising:
one or more memories storing processor-executable code; and
one or more processors coupled with the one or more memories and individually or collectively operable to execute the code to cause the apparatus to:
transmit, from a second user equipment (UE) and to a first UE, both an indication of sidelink resources for reception of a sidelink shared channel transmission from the second UE and an indication of uplink resources for providing sidelink feedback information associated with the sidelink shared channel transmission to a network device;
transmit, from the second UE and to the first UE, a message instructing the first UE to obtain a state of a sidelink communication link between the first UE and the second UE;
transmit, by the second UE, the sidelink shared channel transmission using the indicated sidelink resources to the first UE; and
receive, at the second UE and from the first UE, the sidelink feedback information associated with the sidelink shared channel transmission based on the state of the sidelink communication link indicating that the sidelink communication link is unblocked, wherein the sidelink feedback information indicates whether the sidelink shared channel transmission was decoded by the first UE.

11. The apparatus of claim 10, wherein, to transmit the indication of the uplink resources, the one or more processors are individually or collectively operable to execute the code to cause the apparatus to:
transmit sidelink control information to the first UE, the sidelink control information comprising the indication of the uplink resources.

12. The apparatus of claim 11, wherein the sidelink control information further comprises the indication of the sidelink resources.

13. The apparatus of claim 11, wherein the sidelink control information further comprises one or more of:
a hybrid automatic repeat request process identifier, a sidelink process identifier, a sidelink assignment index, a group index, a new feedback indicator, a trigger bit, or any combination thereof.

14. The apparatus of claim 10, wherein the one or more processors are individually or collectively further operable to execute the code to cause the apparatus to:
receive an indication of one or more UE identifiers from the network device, the one or more UE identifiers corresponding to at least the first UE, wherein transmitting the indication of the uplink resources is based at least in part on receiving the indication of the one or more UE identifiers.

15. The apparatus of claim 10, wherein the one or more processors are individually or collectively further operable to execute the code to cause the apparatus to:
receive a message configuring the second UE with a mapping between a set of UE identifiers and a set of hybrid automatic repeat request process identifiers, wherein transmitting the indication of the uplink resources is based at least in part on receiving the message.

16. The apparatus of claim 10, wherein the one or more processors are individually or collectively further operable to execute the code to cause the apparatus to:
identify a mapping between one or more hybrid automatic repeat request process identifiers and one or more sidelink process identifiers.

17. A method of wireless communications, comprising:
receiving, at a first user equipment (UE) and from a second UE, both an indication of sidelink resources for reception of a sidelink shared channel transmission from the second UE and an indication of uplink resources for providing sidelink feedback information associated with the sidelink shared channel transmission to a network device;
monitoring, at the first UE, the indicated sidelink resources for the sidelink shared channel transmission;
generating, at the first UE, the sidelink feedback information associated with the sidelink shared channel transmission in accordance with the monitoring;
obtaining, at the first UE and based on generating the sidelink feedback information, a state of a sidelink communication link between the first UE and the second UE, the state indicating that the sidelink communication link is blocked; and
transmitting, from the first UE and based on the state of the sidelink communication link indicating that the sidelink communication link is blocked, the sidelink feedback information associated with the sidelink shared channel transmission to the network device via an uplink communication link between the first UE and the network device using the indicated uplink resources, wherein the sidelink feedback information indicates whether the sidelink shared channel transmission is decoded by the first UE.

18. The method of claim 17, wherein receiving the indication of the uplink resources further comprises:
receiving sidelink control information from the second UE, the sidelink control information comprising the indication of the uplink resources.

19. The method of claim 18, wherein the sidelink control information further comprises one or more of:
a hybrid automatic repeat request process identifier, a sidelink process identifier, a sidelink assignment index, a group index, a new feedback indicator, a trigger bit, or any combination thereof.

20. The method of claim 19, wherein generating the sidelink feedback information further comprises:
generating a hybrid automatic repeat request codebook according to one or more of: the hybrid automatic repeat request process identifier, the sidelink process identifier, the sidelink assignment index, the group index, the new feedback indicator, or the trigger bit.

21. The method of claim 17, further comprising:
receiving a message instructing the first UE to obtain the state of the sidelink communication link, wherein transmitting the sidelink feedback information for the sidelink shared channel transmission to the network device using the indicated uplink resources is based at least in part on the message, and wherein obtaining the state of the sidelink communication link comprises determining that communication between the first UE and the second UE is blocked.

22. The method of claim 17, further comprising:
receiving, by the first UE, an indication of an order of attempt sequence for performing multiple transmissions of the sidelink feedback information using either the uplink resources or the sidelink resources, wherein transmitting the sidelink feedback information for the sidelink shared channel transmission to the network device using the indicated uplink resources is based at least in part on the order of attempt sequence.

23. The method of claim 17, further comprising:
identifying a mapping between one or more hybrid automatic repeat request process identifiers and one or more sidelink process identifiers.

24. A method of wireless communications, comprising:
transmitting, from a second user equipment (UE) and to a first UE, both an indication of sidelink resources for reception of a sidelink shared channel transmission from the second UE and an indication of uplink resources for providing sidelink feedback information associated with the sidelink shared channel transmission to a network device;
transmitting, from the second UE and to the first UE, a message instructing the first UE to obtain a state of a sidelink communication link between the first UE and the second UE;
transmitting, from the second UE, the sidelink shared channel transmission using the indicated sidelink resources to the first UE; and
receiving, at the second UE and from the first UE, the sidelink feedback information associated with the sidelink shared channel transmission based on the state of the sidelink communication link indicating that the sidelink communication link is unblocked, wherein the sidelink feedback information indicates whether the sidelink shared channel transmission was decoded by the first UE.

25. The method of claim 24, wherein transmitting the indication of the uplink resources further comprises:
transmitting sidelink control information to the first UE, the sidelink control information comprising the indication of the uplink resources.

26. The method of claim 24, further comprising:
receiving an indication of one or more UE identifiers from the network device, the one or more UE identifiers corresponding to at least the first UE, wherein transmitting the indication of uplink resources is based at least in part on receiving the indication of the one or more UE identifiers.

\* \* \* \* \*